US012581567B2

(12) United States Patent
Cho et al.

(10) Patent No.: US 12,581,567 B2
(45) Date of Patent: Mar. 17, 2026

(54) METHODS AND APPARATUSES FOR DETECTION OF SESSION STATUS

(71) Applicant: Telefonaktiebolaget LM Ericsson (publ), Stockholm (SE)

(72) Inventors: Sangwook Cho, Seoul (KR); Hongseok Kim, Seoul (KR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 373 days.

(21) Appl. No.: 18/269,623

(22) PCT Filed: Dec. 30, 2020

(86) PCT No.: PCT/KR2020/019387
§ 371 (c)(1),
(2) Date: Jun. 26, 2023

(87) PCT Pub. No.: WO2022/145535
PCT Pub. Date: Jul. 7, 2022

(65) Prior Publication Data
US 2024/0064862 A1 Feb. 22, 2024

(51) Int. Cl.
*H04W 76/30* (2018.01)
(52) U.S. Cl.
CPC .................................. *H04W 76/30* (2018.02)
(58) Field of Classification Search
CPC ..... H04W 76/30; H04W 76/34; H04W 88/08; H04W 80/10
See application file for complete search history.

(56) References Cited

U.S. PATENT DOCUMENTS

2019/0075552 A1 3/2019 Yu et al.
2022/0104088 A1* 3/2022 Byun ................ H04W 36/0235
(Continued)

FOREIGN PATENT DOCUMENTS

KR 102115233 B1 5/2020
KR 102149263 B1 8/2020
WO 2019241235 A1 12/2019

OTHER PUBLICATIONS

Author Unknown, "Technical Specification Group Services and System Aspects; Management and orchestration; 5G performance measurements (Release 16)," Technical Specification 28.552, Version 16.8., Dec. 2020, 3GPP Organizational Partners, 196 pages.
(Continued)

*Primary Examiner* — Will W Lin
(74) *Attorney, Agent, or Firm* — Withrow & Terranova, PLLC

(57) ABSTRACT

Methods and apparatuses for detection of session status are disclosed. According to an embodiment, a user plane (UP) of a base station receives, from a control plane (CP) of the base station, a request for releasing at least one bearer for a terminal device. The request comprises time information usable for deriving a first time at which the at least one bearer was detected by the CP of the base station as needing to be released. The UP of the base station determines a session status of the at least one bearer based on the time information and sends, to the CP of the base station, a response to the request. The response comprises the determined session status of the at least one bearer.

16 Claims, 15 Drawing Sheets

(56)  References Cited

U.S. PATENT DOCUMENTS

| | | | |
|---|---|---|---|
| 2022/0279391 A1* | 9/2022 | Bae | H04W 36/0033 |
| 2023/0262840 A1* | 8/2023 | Byun | H04W 76/34 |
| | | | 455/414.1 |
| 2023/0292219 A1* | 9/2023 | Byun | H04W 40/246 |
| 2024/0049328 A1* | 2/2024 | Ock | H04W 76/20 |
| 2024/0057201 A1* | 2/2024 | Godin | H04W 76/27 |

OTHER PUBLICATIONS

Author Unknown, "Technical Specification Group Services and System Aspects; Telecommunicaiton management; Performance Management (PM); Performance measurements; Evolved Universal Terrestrial Radio Access Network (E-UTRAN) (Release 17)," Technical Specification 32.425, Version 17.0.0, Dec. 2020, 3GPP Organizational Partners, 117 pages.

Author Unknown, "Technical Specification Group Radio Access Network; Evolved Universal Terrestrial Radio Access (E-UTRA) and NR; Multi-connectivity; Stage 2 (Release 16)," Technical Specification 37.340, Version 16.3.0, Sep. 2020, 3GPP Organizational Partners, 83 pages.

Author Unknown, "Technical Specification Group Radio Access Network; NG-RAN; Architecture description (Release 16)," Technical Specification 38.401, Version 16.3.0, Sep. 2020, 3GPP Organizational Partners, 78 pages.

Author Unknown, "Technical Specification Group Radio Access Network; NG-RAN; E1 Application Protocol (E1AP) (Release 16)," Technical Specification 38.463, Version 16.2.0, Jul. 2020, 3GPP Organizational Partners, 230 pages.

Mills, et al., "Network Time Protocol Version 4: Protocol and Algorithms Specification," Request for Comments 5905, Jun. 2010, Internet Engineering Task Force, 110 pages.

Ericsson, "R3-197507: Retainability measurements for DRBs and QoS flows, " 3GPP TSG-RAN WG3 Meeting #106, Nov. 18-22, 2019, Reno, Nevada, 22 pages.

International Search Report and Written Opinion for International Patent Application No. PCT/KR2020/019387, mailed Sep. 27, 2021, 10 pages.

* cited by examiner

[Fig. 1]
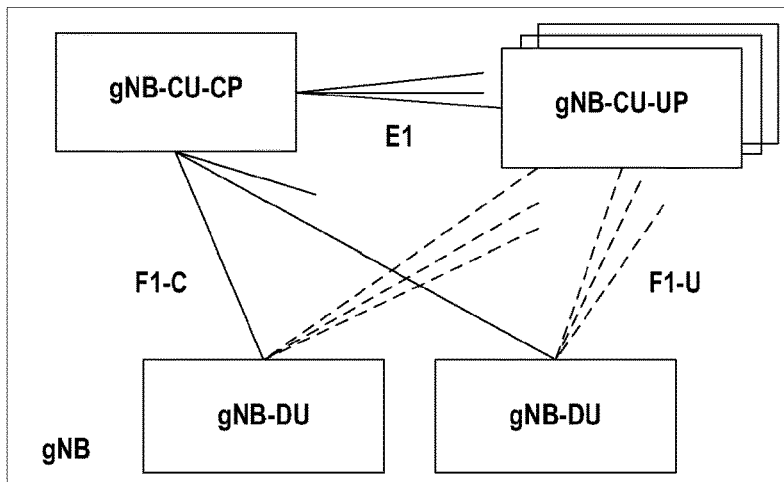
[Fig. 2]
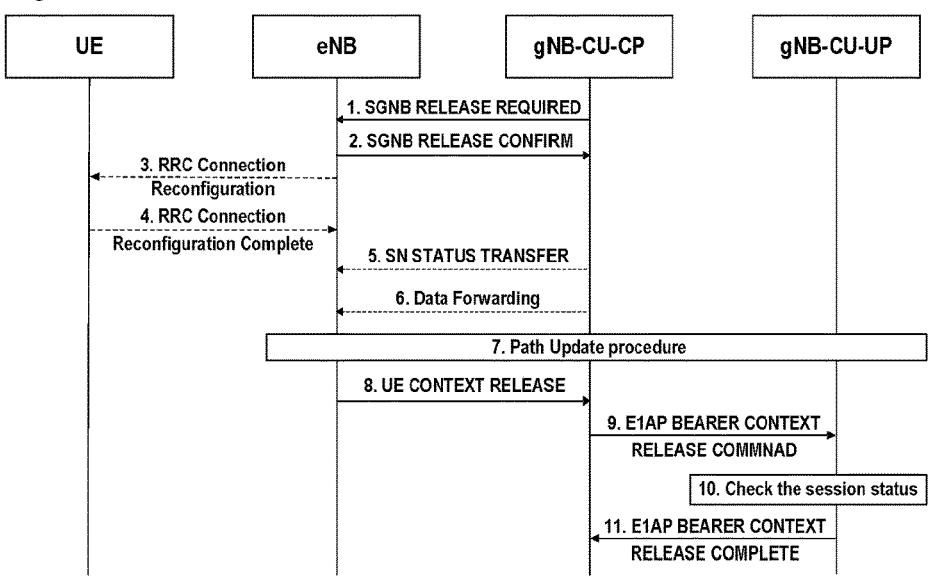
[Fig. 3]
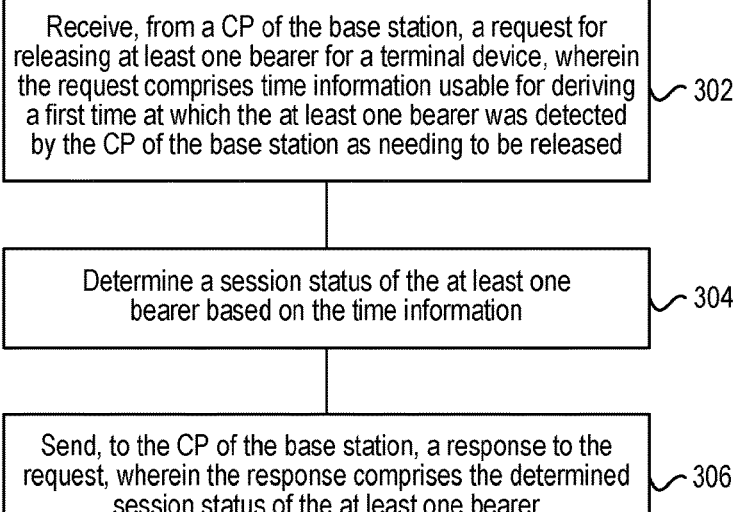

[Fig. 4]

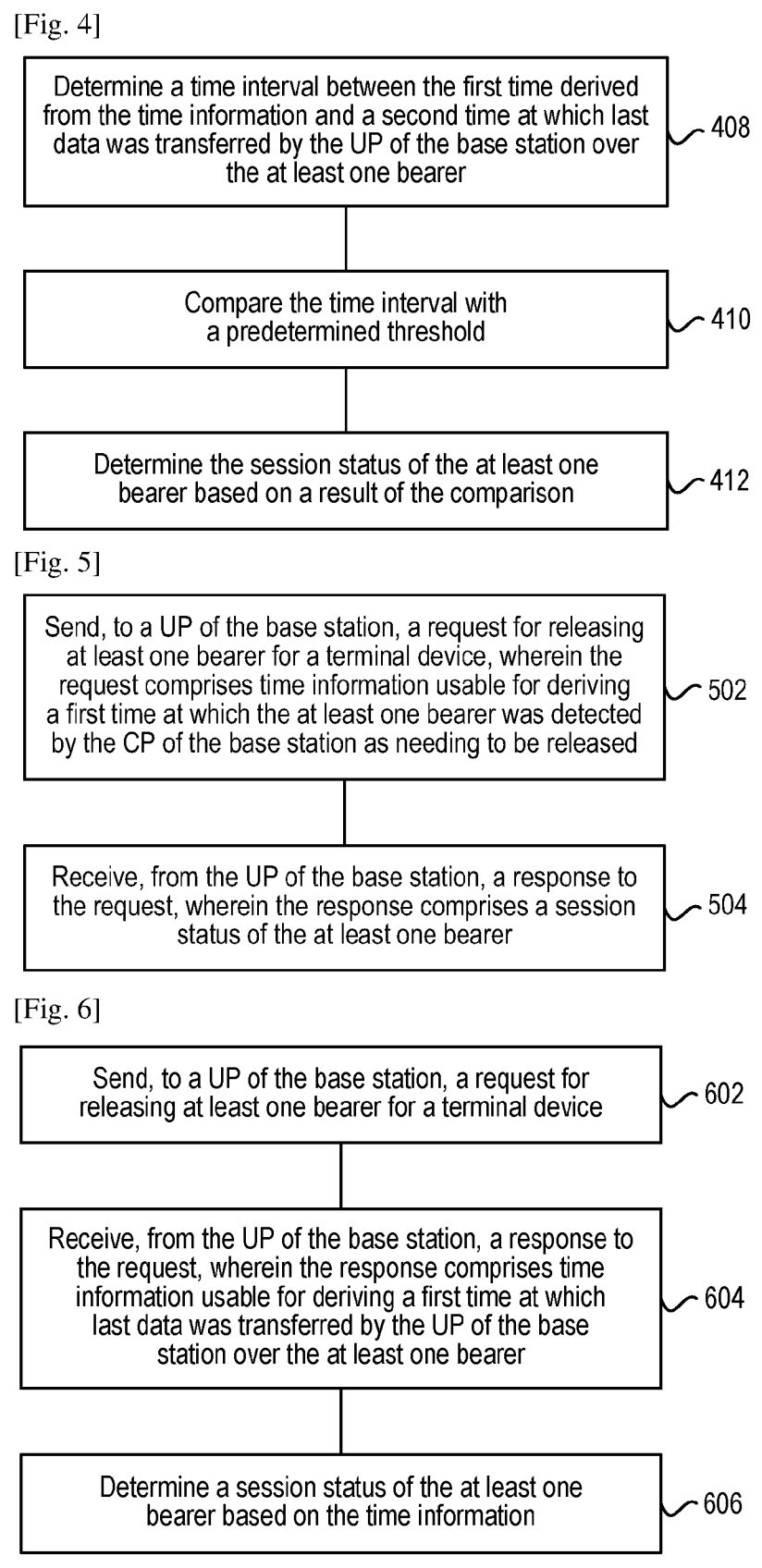

Determine a time interval between the first time derived from the time information and a second time at which last data was transferred by the UP of the base station over the at least one bearer — 408

Compare the time interval with a predetermined threshold — 410

Determine the session status of the at least one bearer based on a result of the comparison — 412

[Fig. 5]

Send, to a UP of the base station, a request for releasing at least one bearer for a terminal device, wherein the request comprises time information usable for deriving a first time at which the at least one bearer was detected by the CP of the base station as needing to be released — 502

Receive, from the UP of the base station, a response to the request, wherein the response comprises a session status of the at least one bearer — 504

[Fig. 6]

Send, to a UP of the base station, a request for releasing at least one bearer for a terminal device — 602

Receive, from the UP of the base station, a response to the request, wherein the response comprises time information usable for deriving a first time at which last data was transferred by the UP of the base station over the at least one bearer — 604

Determine a session status of the at least one bearer based on the time information — 606

[Fig. 7]

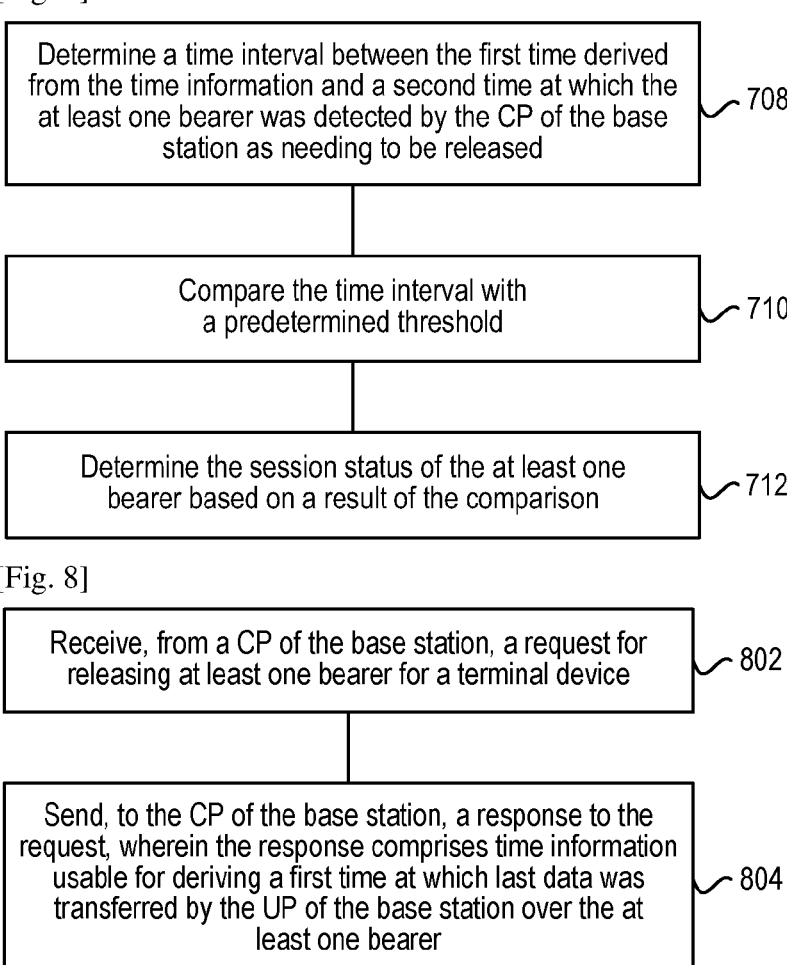

Determine a time interval between the first time derived from the time information and a second time at which the at least one bearer was detected by the CP of the base station as needing to be released ⟋ 708

Compare the time interval with a predetermined threshold ⟋ 710

Determine the session status of the at least one bearer based on a result of the comparison ⟋ 712

[Fig. 8]

Receive, from a CP of the base station, a request for releasing at least one bearer for a terminal device ⟋ 802

Send, to the CP of the base station, a response to the request, wherein the response comprises time information usable for deriving a first time at which last data was transferred by the UP of the base station over the at least one bearer ⟋ 804

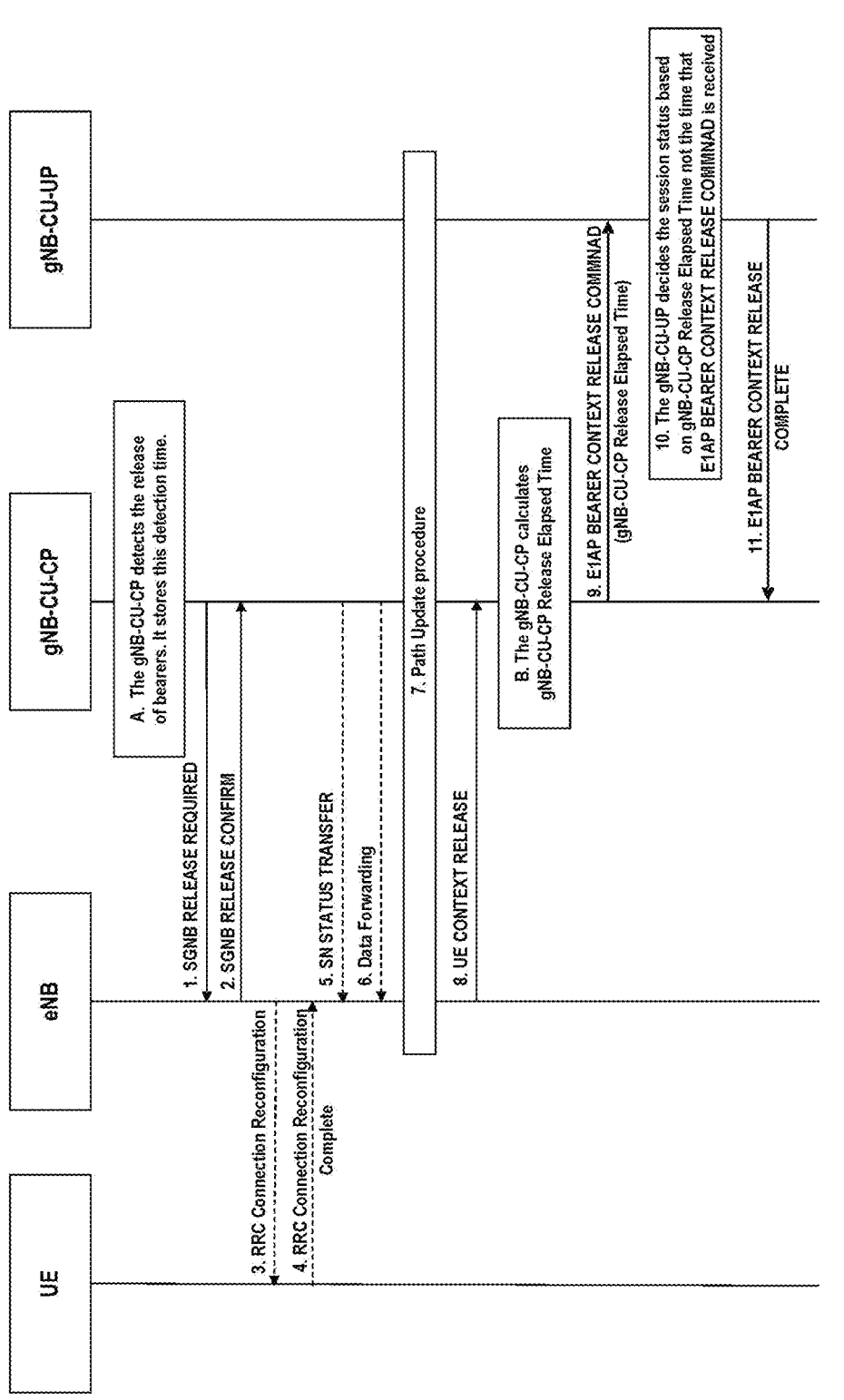
[Figure 9]

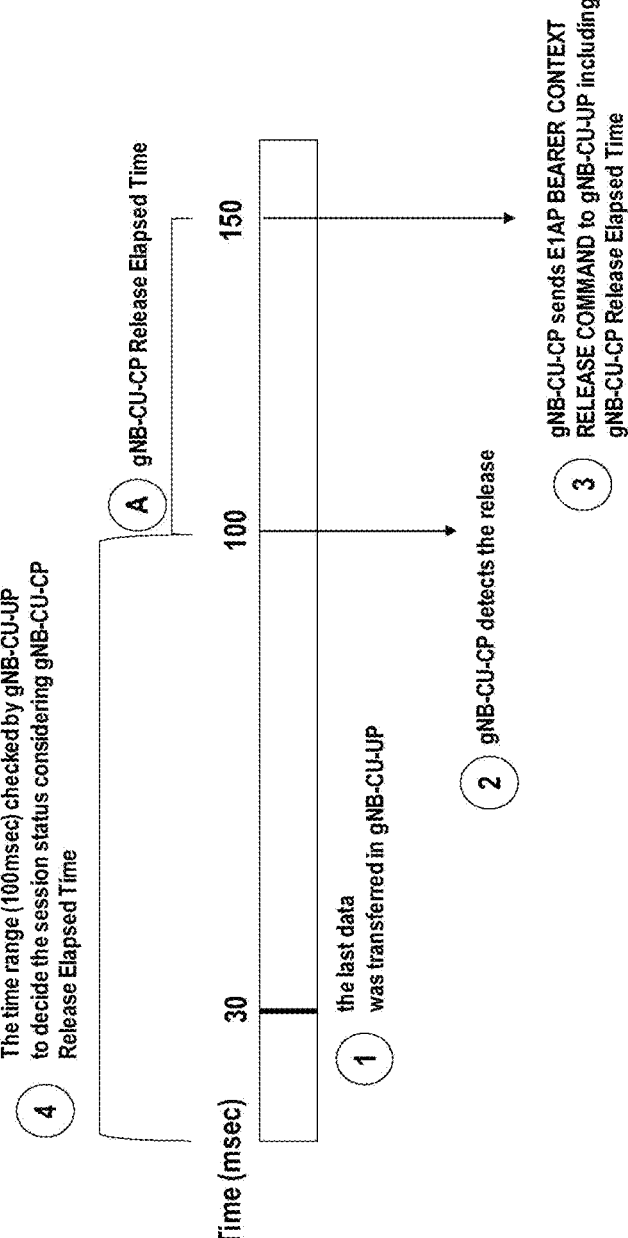
[Figure 10]

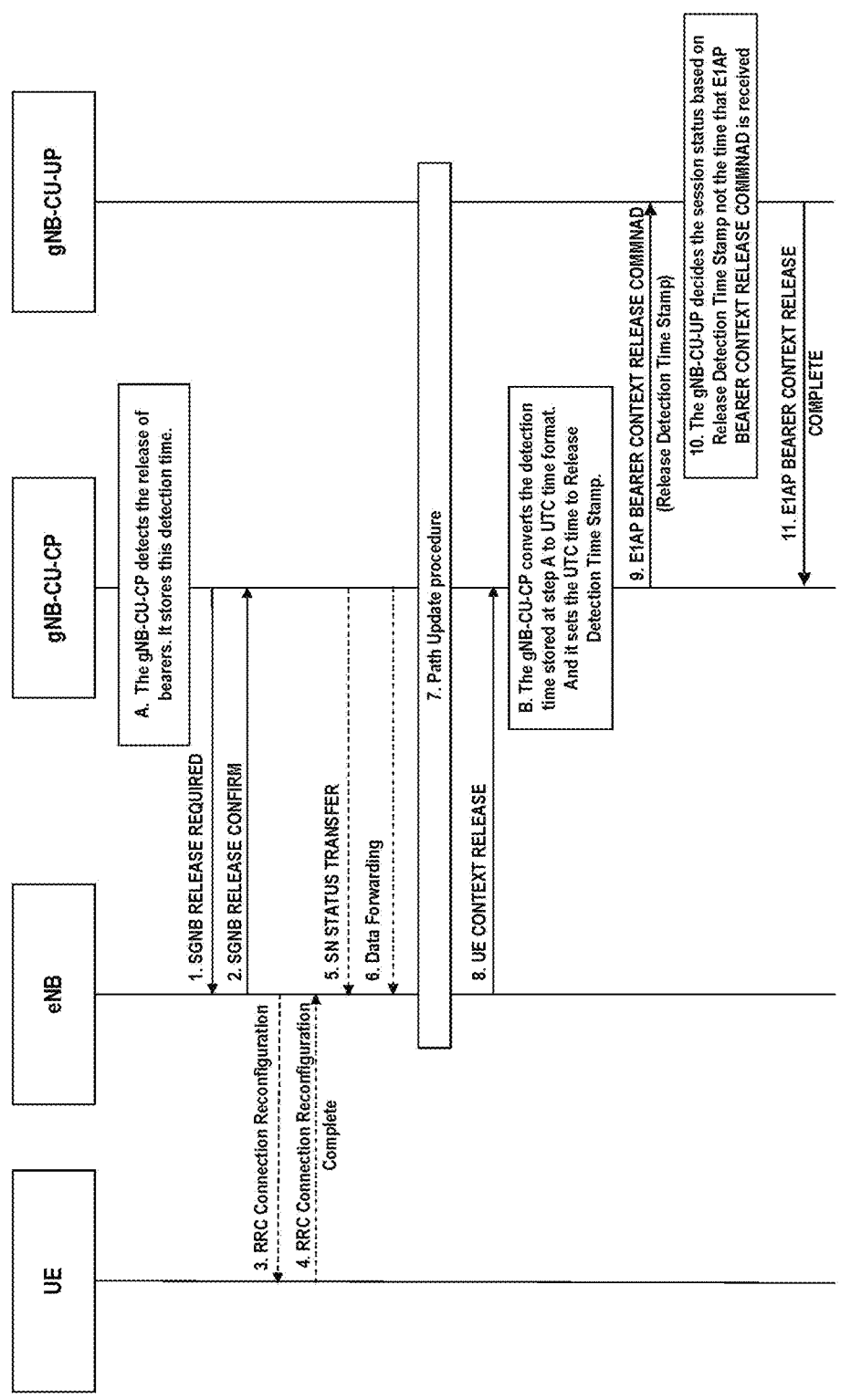
[Figure 11]

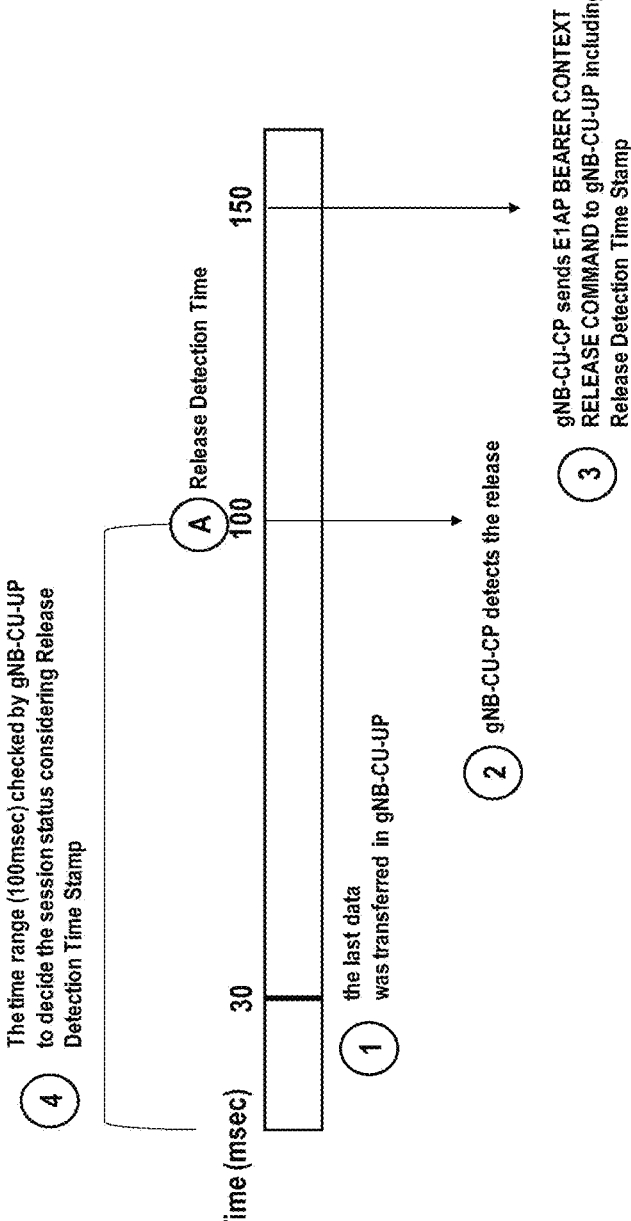
[Figure 12]

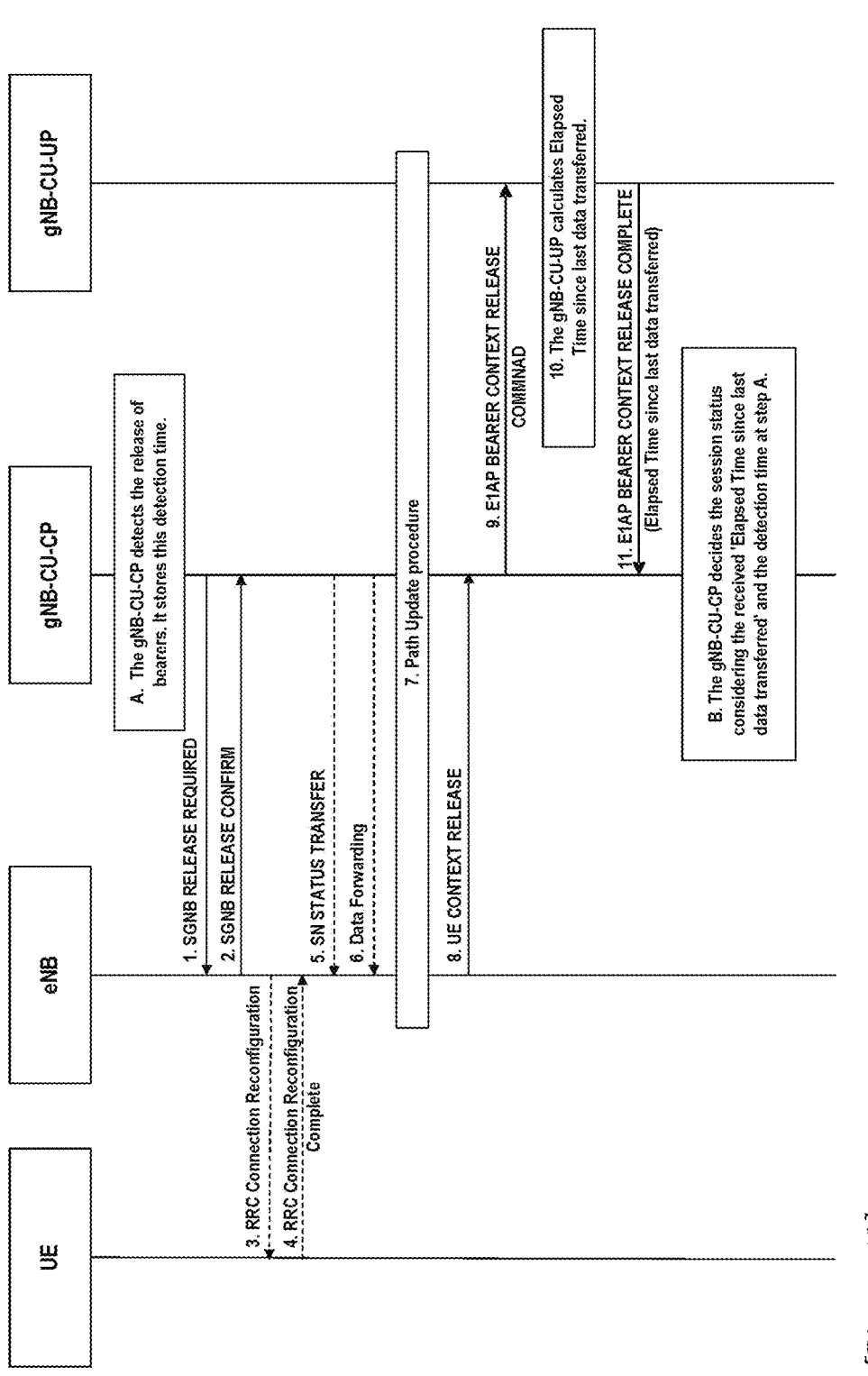
[Figure 13]

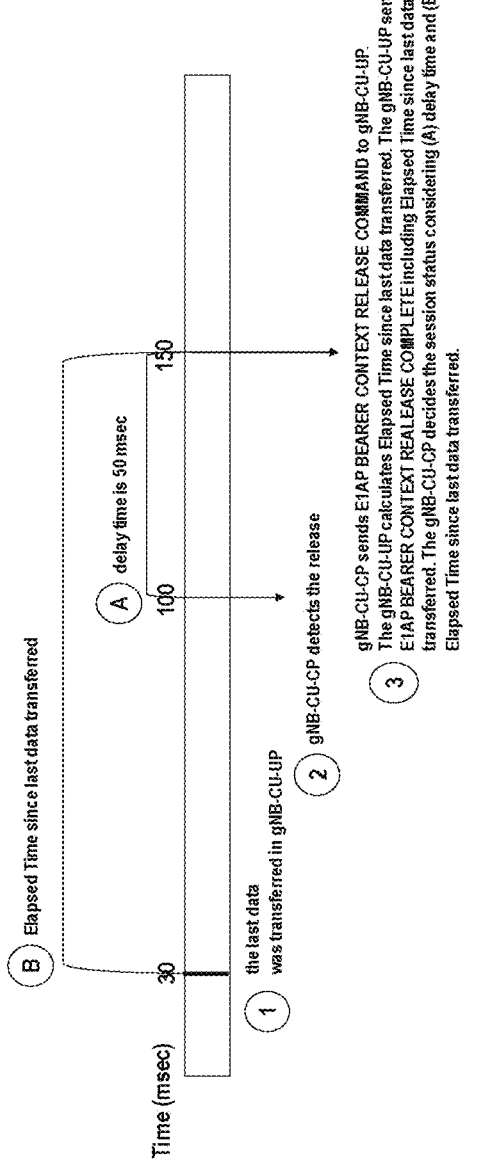
[Figure 14]

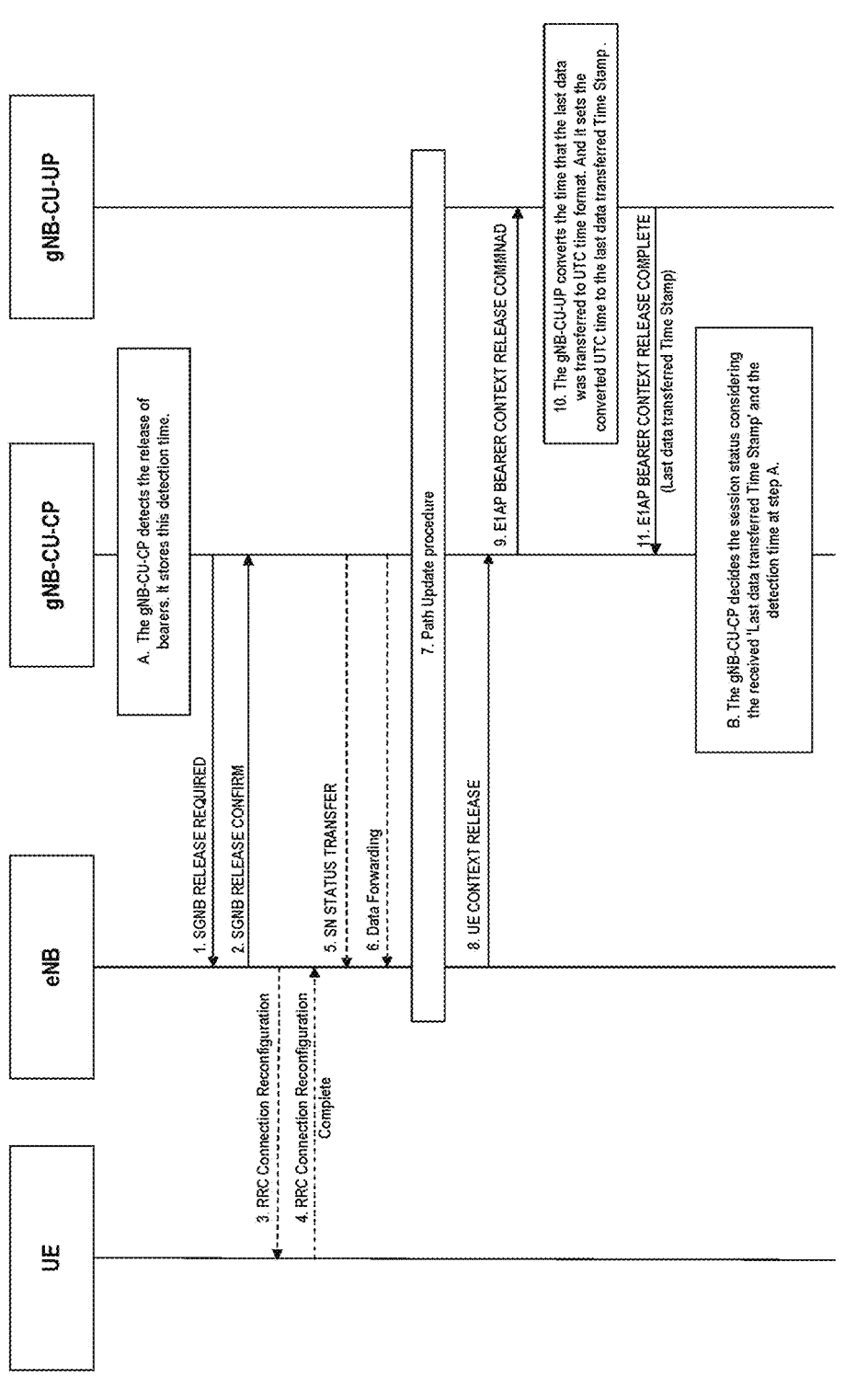
[Figure 15]

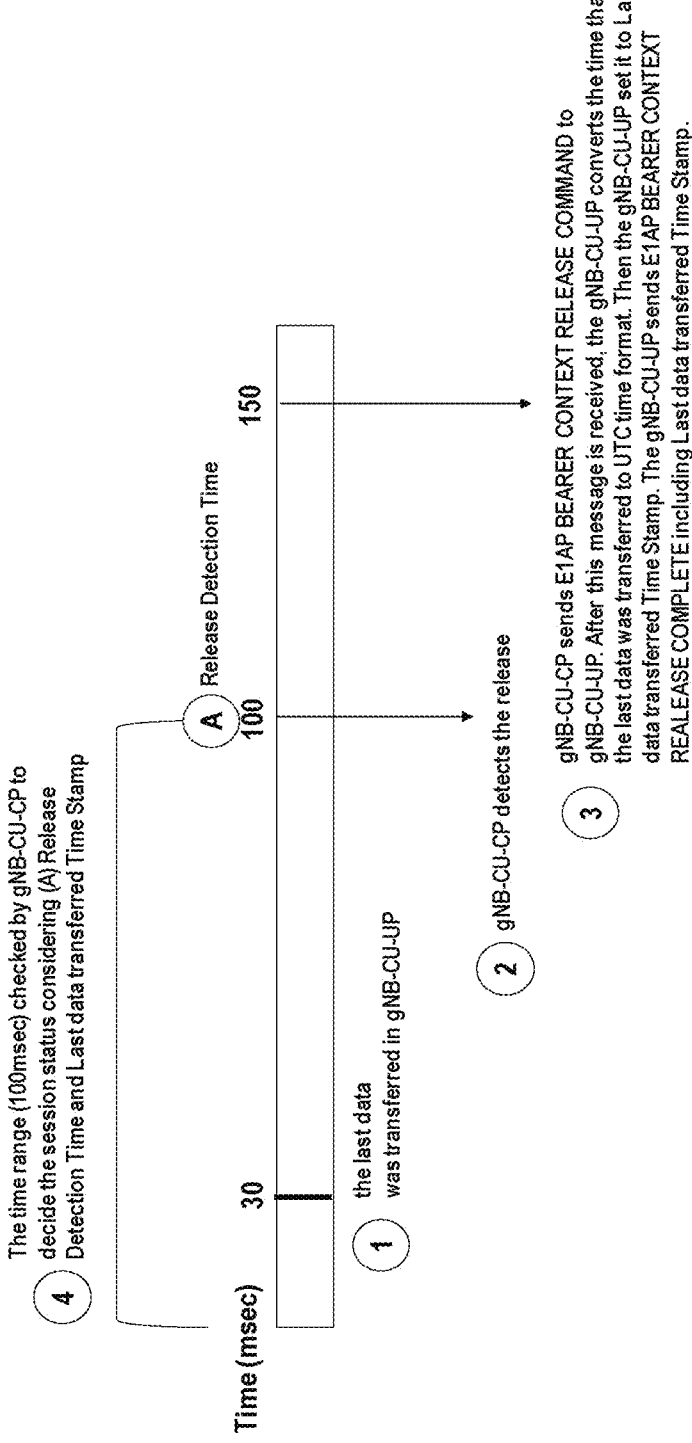
[Figure 16]

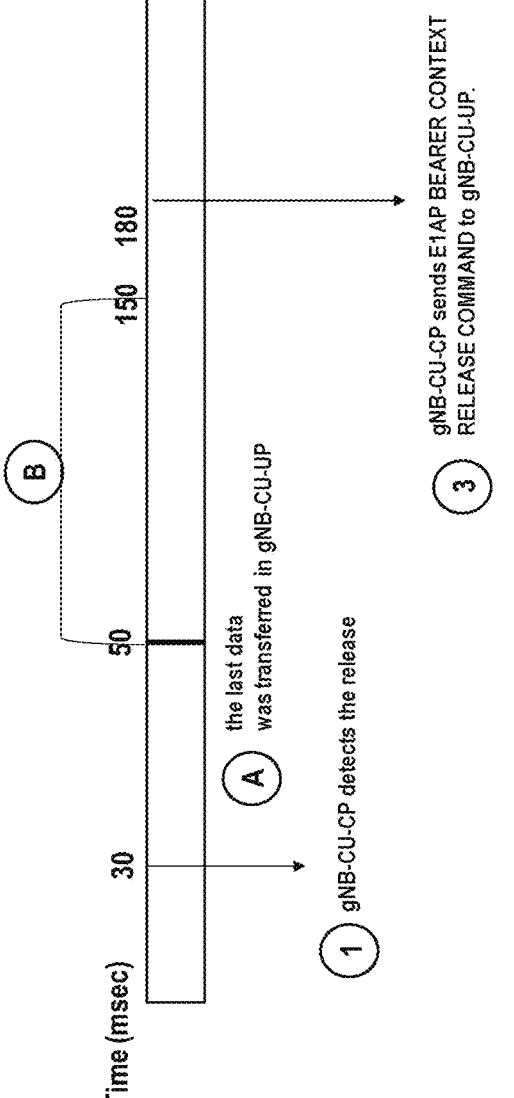
[Figure 17]

【Figure 18】
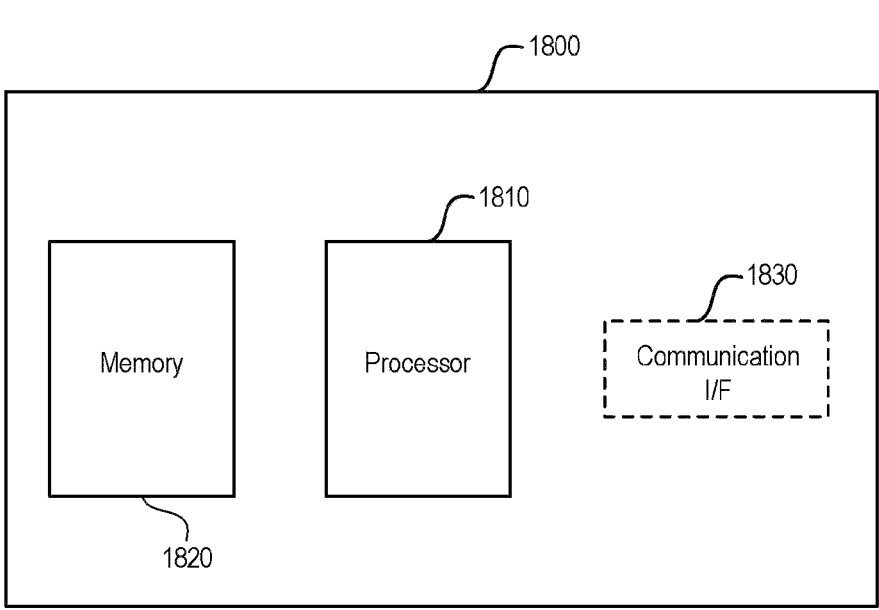

[Fig. 19]
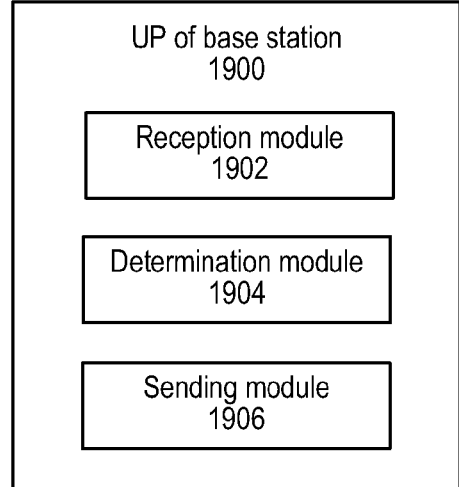
[Fig. 20]
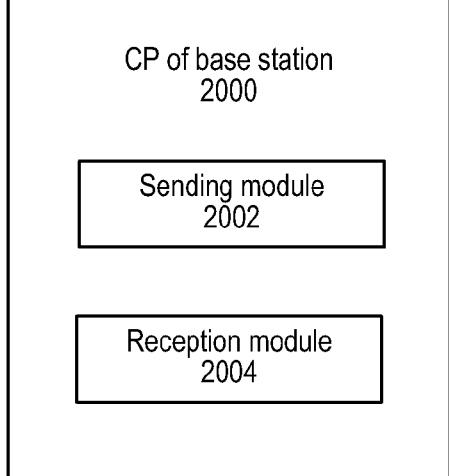
[Fig. 21]
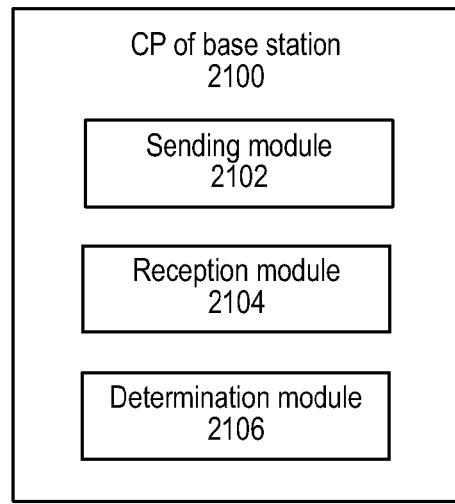

[Fig. 22]

UP of base station
2200

Reception module
2202

Sending module
2204

METHODS AND APPARATUSES FOR DETECTION OF SESSION STATUS

This application is a 35 U.S.C. § 371 national phase filing of International Application No. PCT/KR2020/019387, filed Dec. 30, 2020, the disclosure of which is incorporated herein by reference in its entirety.

TECHNICAL FIELD

Embodiments of the disclosure generally relate to communication, and, more particularly, to methods and apparatuses for detection of session status.

BACKGROUND ART

This section introduces aspects that may facilitate better understanding of the present disclosure. Accordingly, the statements of this section are to be read in this light and are not to be understood as admissions about what is in the prior art or what is not in the prior art.

FIG. 1 is a diagram illustrating the structure of a next generation node B (gNB). As shown, the gNB may contain a gNB distributed unit (gNB-DU) and a gNB central unit (gNB-CU). The gNB-CU may be split into a gNB-CU control plane (gNB-CU-CP) and a gNB-CU user plane (gNB-CU-UP). The interface between the gNB-CU-CP and the gNB-CU-UP is E1 interface and messages transferred are carried by E1 application protocol (E1AP) which is defined in 3rd generation partnership project (3GPP) technical specification (TS) 38.463.

When the gNB-CU-CP part discovers that a flow/bearer should be released or modified, it will "eventually" send a message to the gNB-CU-UP part. Upon reception of the message, the gNB-CU-UP will judge whether the flow/bearer is in-session or not and report that back in the response message to the gNB-CU-CP.

For example, when a user equipment (UE) or data radio bearer (DRB)/quality of service (QoS) flow is released, the gNB-CU-CP may send E1AP BEARER CONTEXT RELEASE COMMAND or E1AP BEARER CONTEXT MODIFICATION REQUEST to the gNB-CU-UP according to each situation through E1 interface. Then, the gNB-CU-UP may determine the session status for each DRB or each QoS flow, and send BEARER CONTEXT RELEASE COMPLETE or BEARER CONTEXT MODIFICATION RESPONSE including Retainability Measurements Information IE to the gNB-CU-CP. The term "IE" refers to information element.

The definition on in-session activity time for UEs has been provided in 3GPP TS 28.552. It defines that: for QoS flows with bursty flow, a UE is said to be "in session" if any QoS flow data on a DRB (uplink (UL) or downlink (DL)) has been transferred during the last 100 ms; for QoS flows with continuous flow, the QoS flow (and the UE) is always seen as being "in session" in the context of this measurement, and the session time is increased from the first data transmission on the QoS flow until 100 ms after the last data transmission on the QoS flow.

As defined in 3GPP TS 38.463, the session status can be reported through Retainability Measurements Information IE in BEARER CONTEXT RELEASE COMPLETE or BEARER CONTEXT MODIFICATION RESPONSE (if there is at least one DRB removed by the gNB-CU-UP). The Retainability Measurements Information IE may include: "QoS Flow Released In Session" which is an indication on whether the QoS flow was in session or not when released (per QoS flow); and "DRB Released In Session" which is an indication on whether the DRB was in session or not when released (per DRB). The value type for "QoS Flow Released In Session" and "DRB Released In Session" is "ENUMERATED (released in session, not released in session, . . . )". More details for Retainability Measurements Information IE are described in change request (CR) R3-197507.

After the gNB-CU-CP receives the response message from the gNB-CU-UP, it can know the session status for the released DRB/QoS flow. This information can be used in various ways. For example, the gNB can provide the customer with the session status when the UE or each DRB/QoS flow is released.

DISCLOSURE OF INVENTION

Technical Problem

This summary is provided to introduce a selection of concepts in a simplified form that are further described below in the detailed description. This summary is not intended to identify key features or essential features of the claimed subject matter, nor is it intended to be used to limit the scope of the claimed subject matter.

Solution to Problem

One of the objects of the disclosure is to provide an improved solution for detection of session status. In particular, one of the problems to be solved by the disclosure is that the existing solution may obtain a wrong detection result of session status due to lack of consideration of a delay time since a control plane (CP) of a base station detects a release of at least one bearer until the CP sends a request for the release to a user plane (UP) of the base station.

According to a first aspect of the disclosure, there is provided a method performed by a UP of a base station. The method may comprise receiving, from a CP of the base station, a request for releasing at least one bearer for a terminal device. The request may comprise time information usable for deriving a first time at which the at least one bearer was detected by the CP of the base station as needing to be released. The method may further comprise determining a session status of the at least one bearer based on the time information. The method may further comprise sending, to the CP of the base station, a response to the request. The response may comprise the determined session status of the at least one bearer.

In this way, it is possible to provide more accurate session status for the bearer(s) to be released.

In an embodiment of the disclosure, the time information may be an elapsed time since the first time until the CP of the base station sends the request to the UP of the base station.

In an embodiment of the disclosure, the time information may be a universal time coordinated (UTC) representation of the first time.

In an embodiment of the disclosure, determining the session status of the at least one bearer based on the time information may comprise determining a time interval between the first time derived from the time information and a second time at which last data was transferred by the UP of the base station over the at least one bearer. Determining the session status of the at least one bearer based on the time information may further comprise comparing the time interval with a predetermined threshold. Determining the session status of the at least one bearer based on the time information may further comprise determining the session status of the at least one bearer based on a result of the comparison.

In an embodiment of the disclosure, the time information may be an elapsed time since the first time until the CP of the base station sends the request to the UP of the base station. The time interval may be determined as a third time at which the UP of the base station receives the request from the CP of the base station minus a sum of the elapsed time and the second time.

In an embodiment of the disclosure, the request may be a Bearer Context Release Command or a Bearer Context Modification Request. The response may be a Bearer Context Release Complete or a Bearer Context Modification Response.

According to a second aspect of the disclosure, there is provided a method performed by a CP of a base station. The method may comprise sending, to a UP of the base station, a request for releasing at least one bearer for a terminal device. The request may comprise time information usable for deriving a first time at which the at least one bearer was detected by the CP of the base station as needing to be released. The method may further comprise receiving, from the UP of the base station, a response to the request. The response may comprise a session status of the at least one bearer.

In this way, it is possible to provide more accurate session status for the bearer(s) to be released.

In an embodiment of the disclosure, the time information may be an elapsed time since the first time until the CP of the base station sends the request to the UP of the base station.

In an embodiment of the disclosure, the time information may be a UTC representation of the first time.

In an embodiment of the disclosure, the request may be a Bearer Context Release Command or a Bearer Context Modification Request. The response may be a Bearer Context Release Complete or a Bearer Context Modification Response.

According to a third aspect of the disclosure, there is provided a method performed by a CP of a base station. The method may comprise sending, to a UP of the base station, a request for releasing at least one bearer for a terminal device. The method may further comprise receiving, from the UP of the base station, a response to the request. The response may comprise time information usable for deriving a first time at which last data was transferred by the UP of the base station over the at least one bearer. The method may further comprise determining a session status of the at least one bearer based on the time information.

In this way, it is possible to provide more accurate session status for the bearer(s) to be released.

In an embodiment of the disclosure, the time information may be an elapsed time since the first time until the UP of the base station sends the response to the CP of the base station.

In an embodiment of the disclosure, the time information may be a UTC representation of the first time.

In an embodiment of the disclosure, determining the session status of the at least one bearer based on the time information may comprise determining a time interval between the first time derived from the time information and a second time at which the at least one bearer was detected by the CP of the base station as needing to be released. Determining the session status of the at least one bearer based on the time information may further comprise comparing the time interval with a predetermined threshold. Determining the session status of the at least one bearer based on the time information may further comprise determining the session status of the at least one bearer based on a result of the comparison.

In an embodiment of the disclosure, the time information may be an elapsed time since the first time until the UP of the base station sends the response to the CP of the base station. The time interval may be determined as a sum of the elapsed time and the second time minus a third time at which the CP of the base station receives the response from the UP of the base station.

In an embodiment of the disclosure, the request may be a Bearer Context Release Command or a Bearer Context Modification Request. The response may be a Bearer Context Release Complete or a Bearer Context Modification Response.

According to a fourth aspect of the disclosure, there is provided a method performed by a UP of a base station. The method may comprise receiving, from a CP of the base station, a request for releasing at least one bearer for a terminal device. The method may further comprise sending, to the CP of the base station, a response to the request. The response may comprise time information usable for deriving a first time at which last data was transferred by the UP of the base station over the at least one bearer.

In this way, it is possible to provide more accurate session status for the bearer(s) to be released.

In an embodiment of the disclosure, the time information may be an elapsed time since the first time until the UP of the base station sends the response to the CP of the base station.

In an embodiment of the disclosure, the time information may be a UTC representation of the first time.

In an embodiment of the disclosure, the request may be a Bearer Context Release Command or a Bearer Context Modification Request. The response may be a Bearer Context Release Complete or a Bearer Context Modification Response.

According to a fifth aspect of the disclosure, there is provided an apparatus implementing a UP of a base station. The apparatus may comprise at least one processor and at least one memory. The at least one memory may contain instructions executable by the at least one processor, whereby the apparatus may be operative to receive, from a CP of the base station, a request for releasing at least one bearer for a terminal device. The request may comprise time information usable for deriving a first time at which the at least one bearer was detected by the CP of the base station as needing to be released. The apparatus may be further operative to determine a session status of the at least one bearer based on the time information. The apparatus may be further operative to send, to the CP of the base station, a response to the request. The response may comprise the determined session status of the at least one bearer.

In an embodiment of the disclosure, the apparatus may be operative to perform the method according to the above first aspect.

According to a sixth aspect of the disclosure, there is provided an apparatus implementing a CP of a base station. The apparatus may comprise at least one processor and at least one memory. The at least one memory may contain instructions executable by the at least one processor, whereby the apparatus may be operative to send, to a UP of the base station, a request for releasing at least one bearer for a terminal device. The request may comprise time information usable for deriving a first time at which the at least one bearer was detected by the CP of the base station as needing to be released. The apparatus may be further operative to receive, from the UP of the base station, a response to the request. The response may comprise a session status of the at least one bearer.

In an embodiment of the disclosure, the apparatus may be operative to perform the method according to the above second aspect.

According to a seventh aspect of the disclosure, there is provided an apparatus implementing a CP of a base station. The apparatus may comprise at least one processor and at least one memory. The at least one memory may contain instructions executable by the at least one processor, whereby the apparatus may be operative to send, to a UP of the base station, a request for releasing at least one bearer for a terminal device. The apparatus may be further operative to receive, from the UP of the base station, a response to the request. The response may comprise time information usable for deriving a first time at which last data was transferred by the UP of the base station over the at least one bearer. The apparatus may be further operative to determine a session status of the at least one bearer based on the time information.

In an embodiment of the disclosure, the apparatus may be operative to perform the method according to the above third aspect.

According to an eighth aspect of the disclosure, there is provided an apparatus implementing a UP of a base station. The apparatus may comprise at least one processor and at least one memory. The at least one memory may contain instructions executable by the at least one processor, whereby the apparatus may be operative to receive, from a CP of the base station, a request for releasing at least one bearer for a terminal device. The apparatus may be further operative to send, to the CP of the base station, a response to the request. The response may comprise time information usable for deriving a first time at which last data was transferred by the UP of the base station over the at least one bearer.

In an embodiment of the disclosure, the apparatus may be operative to perform the method according to the above fourth aspect.

According to a ninth aspect of the disclosure, there is provided a computer program product. The computer program product may comprise instructions which when executed by at least one processor, cause the at least one processor to perform the method according to any of the above first to fourth aspects.

According to a tenth aspect of the disclosure, there is provided a computer readable storage medium. The computer readable storage medium may comprise instructions which when executed by at least one processor, cause the at least one processor to perform the method according to any of the above first to fourth aspects.

According to an eleventh aspect of the disclosure, there is provided an apparatus implementing a UP of a base station. The apparatus may comprise a reception module for receiving, from a CP of the base station, a request for releasing at least one bearer for a terminal device. The request may comprise time information usable for deriving a first time at which the at least one bearer was detected by the CP of the base station as needing to be released. The apparatus may further comprise a determination module for determining a session status of the at least one bearer based on the time information. The apparatus may further comprise a sending module for sending, to the CP of the base station, a response to the request. The response may comprise the determined session status of the at least one bearer.

According to a twelfth aspect of the disclosure, there is provided an apparatus implementing a CP of a base station. The apparatus may comprise a sending module for sending, to a UP of the base station, a request for releasing at least one bearer for a terminal device. The request may comprise time information usable for deriving a first time at which the at least one bearer was detected by the CP of the base station as needing to be released. The apparatus may further comprise a reception module for receiving, from the UP of the base station, a response to the request. The response may comprise a session status of the at least one bearer.

According to a thirteenth aspect of the disclosure, there is provided an apparatus implementing a CP of a base station. The apparatus may comprise a sending module for sending, to a UP of the base station, a request for releasing at least one bearer for a terminal device. The apparatus may further comprise a reception module for receiving, from the UP of the base station, a response to the request. The response may comprise time information usable for deriving a first time at which last data was transferred by the UP of the base station over the at least one bearer. The apparatus may further comprise a determination module for determining a session status of the at least one bearer based on the time information.

According to a fourteenth aspect of the disclosure, there is provided an apparatus implementing a UP of a base station. The apparatus may comprise a reception module for receiving, from a CP of the base station, a request for releasing at least one bearer for a terminal device. The apparatus may comprise a sending module for sending, to the CP of the base station, a response to the request. The response may comprise time information usable for deriving a first time at which last data was transferred by the UP of the base station over the at least one bearer.

According to a fifteenth aspect of the disclosure, there is provided a method performed by a base station. The method may comprise all steps of the methods according to the above first and second aspects.

According to a sixteenth aspect of the disclosure, there is provided a base station. The base station may comprise the apparatus according to the above fifth or eleventh aspect and the apparatus according to the above sixth or twelfth aspect.

According to a seventeenth aspect of the disclosure, there is provided a method performed by a base station. The method may comprise all steps of the methods according to the above third and fourth aspects.

According to an eighteenth aspect of the disclosure, there is provided a base station. The base station may comprise the apparatus according to the above seventh or thirteenth aspect and the apparatus according to the above eighth or fourteenth aspect.

Advantageous Effects of Invention

One of the problems to be solved by the disclosure is that the existing solution may obtain a wrong detection result of session status due to lack of consideration of a delay time since a control plane (CP) of a base station detects a release of at least one bearer until the CP sends a request for the release to a user plane (UP) of the base station.

BRIEF DESCRIPTION OF DRAWINGS

These and other objects, features and advantages of the disclosure will become apparent from the following detailed description of illustrative embodiments thereof, which are to be read in connection with the accompanying drawings.

FIG. 1 is a diagram illustrating the structure of a gNB;

FIG. 2 is a flowchart illustrating an existing secondary gNB (SgNB) release procedure;

FIG. 3 is a flowchart illustrating a method performed by a UP of a base station according to an embodiment of the disclosure;

FIG. 4 is a flowchart for explaining the method of FIG. 3;

FIG. 5 is a flowchart illustrating a method performed by a CP of a base station according to an embodiment of the disclosure;

FIG. 6 is a flowchart illustrating a method performed by a CP of a base station according to an embodiment of the disclosure;

FIG. 7 is a flowchart for explaining the method of FIG. 6;

FIG. 8 is a flowchart illustrating a method performed by a UP of a base station according to an embodiment of the disclosure;

FIG. 9 is a flowchart illustrating an exemplary process according to an embodiment of the disclosure;

FIG. 10 is a diagram for explaining the process of FIG. 9;

FIG. 11 is a flowchart illustrating an exemplary process according to an embodiment of the disclosure;

FIG. 12 is a diagram for explaining the process of FIG. 11;

FIG. 13 is a flowchart illustrating an exemplary process according to an embodiment of the disclosure;

FIG. 14 is a diagram for explaining the process of FIG. 13;

FIG. 15 is a flowchart illustrating an exemplary process according to an embodiment of the disclosure;

FIG. 16 is a diagram for explaining the process of FIG. 15;

FIG. 17 is a diagram for explaining the processes of FIGS. 9, 11, 13 and 15;

FIG. 18 is a block diagram showing an apparatus suitable for use in practicing some embodiments of the disclosure;

FIG. 19 is a block diagram showing an apparatus implementing a UP of a base station according to an embodiment of the disclosure;

FIG. 20 is a block diagram showing an apparatus implementing a CP of a base station according to an embodiment of the disclosure;

FIG. 21 is a block diagram showing an apparatus implementing a CP of a base station according to an embodiment of the disclosure; and FIG. 22 is a block diagram showing an apparatus implementing a UP of a base station according to an embodiment of the disclosure.

MODE FOR THE INVENTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Generally, a gNB-CU-UP judges the session status based on the time when it receives the E1AP BEARER CONTEXT RELEASE COMMAND or E1AP BEARER CONTEXT MODIFICATION REQUEST from a gNB-CU-CP.

There may be a delay time in the gNB-CU-CP until the gNB-CU-CP sends these E1AP messages to the gNB-CU-UP since the gNB-CU-CP detects the release for UE, DRB/QoS flow. This delay time can be caused by internal procedure in the gNB-CU-CP or external procedure with an external node like an eNB and so on. The gNB-CU-UP cannot know this delay time caused by the gNB-CU-CP.

When the gNB-CU-UP checks whether the time that the last data was transferred is within 100 msec, it is calculated as of the time when E1AP BEARER CONTEXT RELEASE COMMAND or E1AP BEARER CONTEXT MODIFICATION REQUEST is received. After the session status is decided, the gNB-CU-UP reports that back in the response message to the gNB-CU-CP.

However, there may be the delay time which is already mentioned above between the gNB-CU-CP discovery trigger and until the message to the gNB-CU-UP is sent, and the actual time since the last data transfer at the gNB-CU-UP may be judged wrong.

In summary, rather than when the time that the gNB-CU-CP detects the release of bearers is used, there is more possibility that in-session will be judged not-in-session when the existing solution is used.

For example, FIG. 2 illustrates an example of secondary gNB (SgNB) release procedure in E-UTRAN NR dual connectivity (EN-DC) (secondary node (SN) initiated). The term E-UTRAN refers to evolved universal terrestrial radio access network and the term NR refers to new radio. The SN refers to the radio access node in multi-RAT dual connectivity (MR-DC), with no control plane connection to the core network, providing additional resources to the UE. The SN may be an E-UTRAN NR (en-gNB) (in EN-DC), a secondary next generation eNB (ng-eNB) (in NR E-UTRAN dual connectivity (NE-DC)) or a secondary gNB (in NR-DC and next generation E-UTRAN NR dual connectivity (NGEN-DC)). The term RAT refers to radio access technology. More details of EN-DC can be found from 3GPP TS 37.340.

Assume that the time that the last data was transferred in the gNB-CU-UP is 30 msec. At the time of 70 msec, the gNB-CU-CP detects the UE release. Then it sends SGNB RELEASE REQUIRED at step 1. At the time of 150 msec, after some procedures (from step 2 to step 8), the gNB-CU-CP sends E1AP BEARER CONTEXT RELEASE COMMAND to the gNB-CU-UP at step 9. Then the gNB-CU-UP checks the session status at step 10. The general calculation is as below:

150 msec (the time that E1AP BEARER CONTEXT RELEASE COMMAND is received)−30 msec (the time that the last data was transferred)=120 msec.

Since the result 120 msec is not within 100 msec, the session status is set to not-in-session. The gNB-CU-UP sends E1AP BEARER CONTEXT RELEASE COMPLETE including this session status information to the gNB-CU-CP at step 11.

On the other hand, if it is calculated as of the time that the gNB-CU-CP detects the release at step 1, the calculation is as below:

70 msec (release detection time at step 1)−30 msec (the time that the last data was transferred)=40 msec.

Since the result 40 msec is within 100 msec, the session status can be set to in-session.

In summary, from a customer point of view, the important thing is the time that the release of UE/bearers is detected in the gNB, not the time when the E1AP message is sent to the gNB-CU-UP which is one component of the gNB. Even though it is actually in-session, if the session status is set to not-in-session by the impact of the gNB-CU-CP procedure delay, it would not be acceptable from the customer point of view.

The present disclosure proposes an improved solution for detection of session status. The solution may be applied to a communication system including a terminal device and a base station. The terminal device can communicate through a radio access communication link with the base station. The base station can provide radio access communication links to terminal devices that are within its communication service cell. The communications may be performed between the terminal device and the base station according to any suitable communication standards and protocols.

The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The term "base station (BS)" may be, for example, a node B (NodeB or NB), an evolved NodeB (eNodeB or eNB), a next generation NodeB (gNodeB or gNB), an integrated access backhaul (IAB), a remote radio unit (RRU), a radio header (RH), a remote radio head (RRH), a relay, a low power node such as a femto, a pico, and so forth. A base station may comprise a central unit (CU) including CU user plane (UP) and CU control plane (CP) and one or more distributed units (DUs). The CU and DU(s) may co-locate in a same network node, e.g. a same base station.

The gNB-DU is a logical node hosting radio link control (RLC), medium access control (MAC) and physical (PHY) layers of the gNB or en-gNB, and its operation is partly controlled by gNB-CU. One gNB-DU supports one or multiple cells. One cell is supported by only one gNB-DU. The gNB-DU terminates the F1 interface connected with the gNB-CU.

The gNB-CU is a logical node hosting radio resource control (RRC), service data adaptation protocol (SDAP) and packet data convergence protocol (PDCP) protocols of the gNB or RRC and PDCP protocols of the en-gNB that controls the operation of one or more gNB-DUs. The gNB-CU terminates the F1 interface connected with the gNB-DU.

The gNB-CU-CP is a logical node hosting the RRC and the control plane part of the PDCP protocol of the gNB-CU for an en-gNB or a gNB. The gNB-CU-CP terminates the E1 interface connected with the gNB-CU-UP and the F1-C interface connected with the gNB-DU. The gNB-CU-UP is a logical node hosting the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU. More details of the gNB can be found from 3GPP TS 38.300.

Hereinafter, the solution of the present disclosure will be described in detail with reference to FIGS. 3-22. FIG. 3 is a flowchart illustrating a method performed by a UP of a base station according to an embodiment of the disclosure. For example, the base station may be a gNB including a DU, a CU-UP and a CU-CP. The UP of the base station may be the CU-UP of the gNB and a CP of the base station may be the CU-CP of the gNB. Note that the network function or network node described herein (e.g. the UP of the base station, or the CP of the base station) can be implemented either as a network element on a dedicated hardware, as a software instance running on a dedicated hardware, or as a virtualized function instantiated on an appropriate platform, e.g. on a cloud infrastructure. At block 302, the UP of the base station receives, from the CP of the base station, a request for releasing at least one bearer for a terminal device. The request comprises time information usable for deriving a first time at which the at least one bearer was detected by the CP of the base station as needing to be released. As an example, the request may be a Bearer Context Release Command. This request can be used for releasing all the bearers for the terminal device, without containing information about the specific bearers requested to be released. When receiving this message, the UP of the base station can know that all the bearers should be released for the terminal device since the Bearer Context Release Command itself means that all the bearers should be released. As another example, the request may be a Bearer Context Modification Request. This request can be used for releasing a portion of all the bearers for the terminal device and thus contains information about the specific bearer(s) requested to be released. The term bearer used here may cover DRB and QoS flow.

As a first option, the time information may be an elapsed time since the first time until the CP of the base station sends the request to the UP of the base station. For this option, the elapsed time may be subtracted from a third time at which the UP of the base station receives the request from the CP of the base station, so as to derive the first time. As a second option, the time information may be a universal time coordinated (UTC) representation of the first time. For this option, the first time may be derived by converting the UTC representation to the time format used by the UP of the base station. The time information may indicate only one first time regardless of the number of bearers requested to be released.

At block 304, the UP of the base station determines a session status of the at least one bearer based on the time information. For example, block 304 may be implemented as blocks 408-412 of FIG. 4. At block 408, the UP of the base station determines a time interval between the first time derived from the time information and a second time at which last data was transferred by the UP of the base station over the at least one bearer. For the above first option where the time information is the elapsed time, the time interval may be determined as the third time at which the UP of the base station receives the request from the CP of the base station minus a sum of the elapsed time and the second time. For the above second option where the time information is the UTC representation, the time interval may be determined as a difference between the time format converted from the UTC representation and the second time. Note that when more than one bearer needs to be released, since the number of the second time is more than one, the number of the determined time intervals is also more than one.

At block 410, the UP of the base station compares the time interval with a predetermined threshold. At block 412, the UP of the base station determines the session status of the at least one bearer based on a result of the comparison. For example, for one of the at least one bearer, if the time interval determined for the bearer is smaller than or equal to the predetermined threshold, the session status of the bearer may be determined as in-session. On the other hand, if the time interval determined for the bearer is larger than the predetermined threshold, the session status of the bearer may be determined as not-in-session.

At block 306, the UP of the base station sends, to the CP of the base station, a response to the request. The response comprises the determined session status of the at least one bearer. As an example, the response may be a Bearer Context Release Complete. As another example, the response may be a Bearer Context Modification Response. With the method of FIG. 3, since the delay time since the CP of the base station detects the release of the at least one bearer until the CP sends the request to the UP of the base station is excluded during the detection of session status, it is possible to provide more accurate session status for the bearer(s) to be released.

FIG. 5 is a flowchart illustrating a method performed by a CP of a base station according to an embodiment of the disclosure. For example, the base station may be a gNB including a DU, a CU-UP and a CU-CP. The CP of the base station may be the CU-CP of the gNB and a UP of the base station may be the CU-UP of the gNB. At block 502, the CP of the base station sends, to the UP of the base station, a request for releasing at least one bearer for a terminal device. The request comprises time information usable for deriving a first time at which the at least one bearer was detected by the CP of the base station as needing to be released. As described above with respect to block 302, as an example, the request may be a Bearer Context Release Command. As another example, the request may be a Bearer Context Modification Request. The term bearer used here may cover DRB and QoS flow. As a first option, the time information may be an elapsed time since the first time until the CP of the base station sends the request to the UP of the base station. As a second option, the time information may be a UTC representation of the first time.

At block 504, the CP of the base station receives, from the UP of the base station, a response to the request. The response comprises a session status of the at least one bearer. As described above with respect to block 306, as an example, the response may be a Bearer Context Release Complete. As another example, the response may be a Bearer Context Modification Response. With the method of FIG. 5, because the time information is sent to the UP of the base station such that the delay time since the CP of the base station detects the release of the at least one bearer until the CP sends the request to the UP of the base station can be excluded during the detection of session status, it is possible to provide more accurate session status for the bearer(s) to be released.

FIG. 6 is a flowchart illustrating a method performed by a CP of a base station according to an embodiment of the disclosure. For example, the base station may be a gNB including a DU, a CU-UP and a CU-CP. The CP of the base station may be the CU-CP of the gNB and a UP of the base station may be the CU-UP of the gNB. At block 602, the CP of the base station sends, to the UP of the base station, a request for releasing at least one bearer for a terminal device. As an example, the request may be a Bearer Context Release Command. As another example, the request may be a Bearer Context Modification Request. The term bearer used here may cover DRB and QoS flow. At block 604, the CP of the base station receives, from the UP of the base station, a response to the request. The response comprises time information usable for deriving a first time at which last data was transferred by the UP of the base station over the at least one bearer. As an example, the response may be a Bearer Context Release Complete. As another example, the response may be a Bearer Context Modification Response.

As a first option, the time information may be an elapsed time since the first time until the UP of the base station sends the response to the CP of the base station. For this option, the elapsed time may be subtracted from a third time at which the CP of the base station receives the response from the UP of the base station, so as to derive the first time. As a second option, the time information may be a UTC representation of the first time. For this option, the first time may be derived by converting the UTC representation to the time format used by the CP of the base station. Since the first time may be different from each bearer requested to be released, the time information may indicate more than one first time when the number of bearers requested to be released is more than one.

At block 606, the CP of the base station determines a session status of the at least one bearer based on the time information. For example, block 606 may be implemented as blocks 708-712 of FIG. 7. At block 708, the CP of the base station determines a time interval between the first time derived from the time information and a second time at which the at least one bearer was detected by the CP of the base station as needing to be released. For the above first option where the time information is the elapsed time, the time interval may be determined as a sum of the elapsed time and the second time minus the third time at which the CP of the base station receives the response from the UP of the base station. For the above second option where the time information is the UTC representation, the time interval may be determined as a difference between the second time and the time format converted from the UTC representation. Note that when more than one bearer needs to be released, since the number of the first time is more than one, the number of the determined time intervals is also more than one.

At block 710, the CP of the base station compares the time interval with a predetermined threshold. At block 712, the CP of the base station determines the session status of the at least one bearer based on a result of the comparison. For example, for one of the at least one bearer, if the time interval determined for the bearer is smaller than or equal to the predetermined threshold, the session status of the bearer may be determined as in-session. On the other hand, if the time interval determined for the bearer is larger than the predetermined threshold, the session status of the bearer may be determined as not-in-session. With the method of FIG. 6, since the delay time since the CP of the base station detects the release of the at least one bearer until the CP sends the request to the UP of the base station is excluded during the detection of session status, it is possible to provide more accurate session status for the bearer(s) to be released.

FIG. 8 is a flowchart illustrating a method performed by a UP of a base station according to an embodiment of the disclosure. For example, the base station may be a gNB including a DU, a CU-UP and a CU-CP. The UP of the base station may be the CU-UP of the gNB and a CP of the base station may be the CU-CP of the gNB. At block 802, the UP of the base station receives, from the CP of the base station, a request for releasing at least one bearer for a terminal device. As described above with respect to block 602, as an example, the request may be a Bearer Context Release Command. As another example, the request may be a Bearer Context Modification Request. The term bearer used here may cover DRB and QoS flow.

At block 804, the UP of the base station sends, to the CP of the base station, a response to the request. The response comprises time information usable for deriving a first time at which last data was transferred by the UP of the base station over the at least one bearer. As described above with respect to block 604, as an example, the response may be a Bearer Context Release Complete. As another example, the response may be a Bearer Context Modification Response. As a first option, the time information may be an elapsed time since the first time until the UP of the base station sends the response to the CP of the base station. As a second option, the time information may be a UTC representation of the first time. With the method of FIG. 8, because the time information is sent to the CP of the base station such that the delay time since the CP of the base station detects the release of the at least one bearer until the CP sends the request to the UP of the base station can be excluded during the detection of session status, it is possible to provide more accurate session status for the bearer(s) to be released.

FIG. 9 is a flowchart illustrating an exemplary process according to an embodiment of the disclosure. As shown, the process involves a UE, an eNB, a gNB-CU-CP and a gNB-CU-UP. In this process, the gNB-CU-CP informs the gNB-CU-UP of the gNB-CU-CP Release Elapsed Time so that the gNB-CU-UP can consider this time when it decides the session status. At step A, the gNB-CU-CP detects the release of bearers. It stores this release detection time. At steps 1-8, some procedures which are the same as the existing solution of FIG. 2 are executed. At step B, the gNB-CU-CP calculates gNB-CU-CP Release Elapsed Time. It can be calculated as below:

gNB-CU-CP Release Elapsed Time=the current time at step B−release detection time stored at step A.

At step 9, the gNB-CU-CP includes gNB-CU-CP Release Elapsed Time in E1AP BEARER CONTEXT RELEASE COMMAND message. At step 10, the gNB-CU-UP decides the session status considering the received gNB-CU-CP Release Elapsed Time. For example, the gNB-CU-UP can get the current time and obtain a result as below:

result=(current time−gNB-CU-CP Release Elapsed Time)−the time that the last data was transferred.

If the result is not more than 100 msec, the session status is set to in-session. At step 11, the gNB-CU-UP sets the session status in the existing Retainability Measurements Information IE and sends E1AP BEARER CONTEXT RELEASE COMPLETE including this information.

FIG. 10 is a diagram illustrating an example for explaining the process of FIG. 9. At step 1, the data stopped at 30 msec. It is the time that the last data was transferred. At step 2, the gNB-CU-CP detects the release of the bearers at 100 msec. It stores this time. At step 3, the gNB-CU-CP calculates (A) gNB-CU-CP Release Elapsed Time as below.

gNB-CU-CP Release Elapsed Time=150 msec−100 msec=50 msec.

The gNB-CU-CP sends E1AP BEARER CONTEXT RELEASE COMMAND to the gNB-CU-UP including gNB-CU-CP Release Elapsed Time. At step 4, if the E1AP BEARER CONTEXT RELEASE COMMAND is received, the gNB-CU-UP decides the session status considering gNB-CU-CP Release Elapsed Time. Assume that E1AP BEARER CONTEXT RELEASE COMMAND is received at 150 msec. The gNB-CU-UP can know when the release of bearers in the gNB-CU-CP is detected by the below calculation.

150 msec−gNB-CU-CP Release Elapsed Time (50 msec)=100 msec.

The session status can be decided by the below calculation.

100 msec−the time that the last data transferred (30 msec)=70 msec.

Since 70 msec is not more than 100 msec range, the session status is set to in-session.

Considering that the gNB-CU-UP and the gNB-CU-CP can be deployed with different vendors, defining new IE(s) in the related technical specification would be a convenient way for delivering time information between the gNB-CU-UP and the gNB-CU-CP. Then the above process can be applied commonly without any dependency with vendors.

To support the process of FIG. 9, the following changes highlighted with underlines are proposed to be made to 3GPP TS 38.463 V16.2.0.

9.2.2.9 Bearer Context Release Command

This message is sent by the gNB-CU-CP to command the gNB-CU-UP to release an UE-associated logical E1 connection.

Direction: gNB-CU-CP® gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| Cause | M | | 9.3.1.2 | | YES | ignore |
| gNB-CU-CP Release Elapsed Time | O | — | 9.3.1.XX | — | YES | ignore |

9.2.2.4 Bearer Context Modification Request

This message is sent by the gNB-CU-CP to request the gNB-CU-UP to modify a bearer context.

Direction: gNB-CU-CP® gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |

-continued

| IE/Group Name | Presence | Range | IE type and reference | Semantics description | Criticality | Assigned Criticality |
|---|---|---|---|---|---|---|
| gNB-CU-UP UE E1AP ID | M | | 9.3.1.5 | | YES | reject |
| Security Information | O | | 9.3.1.10 | | YES | reject |
| UE DL Aggregate Maximum Bit Rate | O | | Bit Rate 9.3.1.20 | | YES | reject |
| UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. | YES | reject |
| Bearer Context Status Change | O | | ENUMERATED (Suspend, Resume, . . .) | Indicates the status of the Bearer Context | YES | reject |
| New UL TNL Information Required | O | | ENUMERATED (required, . . .) | Indicates that new UL TNL information has been requested to be provided. | YES | reject |
| UE Inactivity Timer | O | | Inactivity Timer 9.3.1.54 | Included if the Activity Notification Level is set to UE. | — | — |
| Data Discard Required | O | | ENUMERATED (required, . . .) | Indicate to discard the DL user data in case of RAN paging failure. | YES | ignore |
| CHOICE System | O | | | | YES | reject |
| >E-UTRAN | | | | | | |
| >>DRB To Setup List | O | | DRB To Setup Modification List E-UTRAN 9.3.3.7 | | YES | reject |
| >>DRB To Modify List | O | | DRB To Modify List E-UTRAN 9.3.3.8 | | YES | reject |
| >>DRB To Remove List | O | | DRB To Remove List E-UTRAN 9.3.3.9 | | YES | reject |
| >>Subscriber Profile ID for RAT/Frequency priority | O | | 9.3.1.69 | | YES | ignore |
| >>Additional RRM Policy Index | O | | 9.3.1.70 | | YES | ignore |
| >NG-RAN | | | | | | |
| >>PDU Session Resource To Setup List | O | | PDU Session Resource To Setup Modification List 9.3.3.10 | | YES | reject |
| >>PDU Session Resource To Modify List | O | | 9.3.3.11 | | YES | reject |
| >>PDU Session Resource To Remove List | O | | 9.3.3.12 | | YES | reject |
| RAN UE ID | O | | OCTET STRING (SIZE(8)) | | YES | ignore |

-continued

| IE/Group Name | Presence | Range | IE type and reference | Semantics description | Criticality | Assigned Criticality |
|---|---|---|---|---|---|---|
| gNB-DU ID | O | | 9.3.1.65 | | YES | ignore |
| Activity Notification Level | | | 9.3.1.67 | | YES | ignore |
| gNB-CU-CP Release Elapsed Time | O | — | 9.3.1.XX | — | YES | ignore |

9.3.L.XX gNB-CU-CP Release Elapsed Time

This IE indicates the elapsed time until gNB-CU-CP sends the message to gNB-CU-UP since gNB-CU-CP detects the release for UE, DRB/QoS flow

| IE/Group Name | Presence | Range | IE type and reference | Semantics description |
|---|---|---|---|---|
| gNB-CU-CP Release Elapsed Time | O | — | INTEGER (1 . . . 65535, . . .) | The values are expressed in ms |

8.3.4.2 Successful Operation

. . .

FIG. 8.3.4.2-1: Bearer Context Release Procedure: Successful Operation.

The gNB-CU-CP initiates the procedure by sending the BEARER CONTEXT RELEASE COMMAND message to the gNB-CU-UP. The gNB-CU-UP replies with the BEARER CONTEXT RELEASE COMPLETE message.

Upon reception of the BEARER CONTEXT RELEASE COMMAND message, the gNB-CU-UP shall release all related signalling and user data transport resources and reply with the BEARER CONTEXT RELEASE COMPLETE message.

The gNB-CU-UP shall, if supported, include the Retainability Measurements Information IE in the BEARER CONTEXT RELEASE COMPLETE message, providing information on the removed DRB(s) for retainability measurements in the gNB-CU-CP, as described in TS 32.425 [26] and TS 28.552 [22]

If the gNB-CU-CP Release Elapsed Time IE is included in BEARER CONTEXT RELEASE COMMAND, The gNB-CU-UP shall, if supported, considers gNB-CU-CP Release Elapsed Time IE for providing the Retainability Measurements Information IE.

8.3.2.2 Successful Operation

. . .

If gNB-CU-CP Release Elapsed Time IE is included in BEARER CONTEXT MODIFICATION REQUEST. The gNB-CU-UP shall, if supported, considers gNB-CU-CP Release Elapsed Time IE for providing the Retainability Measurements Information IE FIG. 11 is a flowchart illustrating an exemplary process according to an embodiment of the disclosure. As shown, the process involves a UE, an eNB, a gNB-CU-CP and a gNB-CU-UP. In this process, the gNB-CU-CP informs the gNB-CU-UP of the Release Detection Time Stamp (UTC time) so that the gNB-CU-UP can consider this time and decide the session status. Coordinated universal time (or UTC) is the primary time standard by which the world regulates clocks and time. Release Detection Time Stamp is encoded in the same format as the first four octets of the 64-bit timestamp format as defined in section 6 of internet engineering task force (IETF) request for comments (RFC) 5905. At step A, the gNB-CU-CP detects the release of bearers. It stores this release detection time. At steps 1-8, some procedures which are the same as the existing solution of FIG. 2 are executed. At step B, the gNB-CU-CP converts the detection time stored at step A to the UTC time. It sets the UTC time to Release Detection Time Stamp. At step 9, the gNB-CU-CP includes the converted Release Detection Time Stamp in E1AP BEARER CONTEXT RELEASE COMMAND message. At step 10, the gNB-CU-UP decides the session status based on the received Release Detection Time Stamp not the time that E1AP BEARER CONTEXT RELEASE COMMAND is received. The gNB-CU-UP converts the received Release Detection Time Stamp (UTC) to the time format that is used by the gNB-CU-UP. If the time gap between the converted Release Detection Time Stamp and the time that the last data which was transferred is not more than 100 msec, the session status is set to in-session. At step 11, the gNB-CU-UP sets the session status in the existing Retainability Measurements Information IE and sends E1AP BEARER CONTEXT RELEASE COMPLETE including this information.

FIG. 12 is a diagram illustrating an example for explaining the process of FIG. 11. At step 1, the data stopped at 30 msec. It is the time that the last data was transferred. At step 2, the gNB-CU-CP detects the release of the bearers at 100 msec. It stores this time. At step 3, the gNB-CU-CP converts (A) Release Detection Time to UTC time. This converted UTC time is set to Release Detection Time Stamp. Then the gNB-CU-CP sends E1AP BEARER CONTEXT RELEASE COMMAND including Release Detection Time Stamp. At step 4, if the E1AP BEARER CONTEXT RELEASE COMMAND is received, the gNB-CU-UP decides the session status considering (A) Release Detection Time Stamp. The gNB-CU-UP converts (A) Release Detection Time Stamp (UTC format) to the time format used in the gNB-CU-UP. It will be 100 msec in this example. Then, the following result can be obtained:

100 msec–the time that the last data transferred (30 msec)=70 msec.

Since 70 msec is not more than 100 msec range, the session status is set to in-session.

To support the process of FIG. 11, the following changes highlighted with underlines are proposed to be made to 3GPP TS 38.463 V16.2.0.

9.2.2.9 Bearer Context Release Command

This message is sent by the gNB-CU-CP to command the gNB-CU-UP to release an UE-associated logical E1 connection.

Direction: gNB-CU-CP® gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| Cause | M | | 9.3.1.2 | | YES | ignore |
| gNB-CU-CP Release Detection Timez Stamp | O | — | 9.3.1.XX | — | YES | ignore |

9.2.2.4 Bearer Context Modification Request                    20

This message is sent by the gNB-CU-CP to request the gNB-CU-UP to modify a bearer context.

Direction: gNB-CU-CP® gNB-CU-UP

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU-CP UE E1AP ID | M | | 9.3.1.4 | | YES | reject |
| gNB-CU-UP UE E1AP ID | M | | 9.3.1.5 | | YES | reject |
| Security Information | O | | 9.3.1.10 | | YES | reject |
| UE DL Aggregate Maximum Bit Rate | O | | Bit Rate 9.3.1.20 | | YES | reject |
| UE DL Maximum Integrity Protected Data Rate | O | | Bit Rate 9.3.1.20 | The Bit Rate is a portion of the UE's Maximum Integrity Protected Data Rate, and is enforced by the gNB-CU-UP node. | YES | reject |
| Bearer Context Status Change | O | | ENUMERATED (Suspend, Resume, . . .) | Indicates the status of the Bearer Context | YES | reject |
| New UL TNL Information Required | O | | ENUMERATED (required, . . .) | Indicates that new UL TNL information has been requested to be provided. | YES | reject |
| UE Inactivity Timer | O | | Inactivity Timer 9.3.1.54 | Included if the Activity Notification Level is set to UE. | — | — |
| Data Discard Required | O | | ENUMERATED (required, . . .) | Indicate to discard the DL user data in case of RAN paging failure. | YES | ignore |
| CHOICE System >E-UTRAN | O | | | | YES | reject |
| >>DRB To Setup List | O | | DRB To Setup Modification List E-UTRAN 9.3.3.7 | | YES | reject |
| >>DRB To Modify List | O | | DRB To Modify List E-UTRAN 9.3.3.8 | | YES | reject |

-continued

| IE/Group Name | Presence | Range | IE type and reference | Semantics description | Criticality | Assigned Criticality |
|---|---|---|---|---|---|---|
| >>DRB To Remove List | O | | DRB To Remove List E-UTRAN 9.3.3.9 | | YES | reject |
| >>Subscriber Profile ID for RAT/Frequency priority | O | | 9.3.1.69 | | YES | ignore |
| >>Additional RRM Policy Index | O | | 9.3.1.70 | | YES | ignore |
| >NG-RAN | | | | | | |
| >>PDU Session Resource To Setup List | O | | PDU Session Resource To Setup Modification List 9.3.3.10 | | YES | reject |
| >>PDU Session Resource To Modify List | O | | 9.3.3.11 | | YES | reject |
| >>PDU Session Resource To Remove List | O | | 9.3.3.12 | | YES | reject |
| RAN UE ID | O | | OCTET STRING (SIZE(8)) | | YES | ignore |
| gNB-DU ID | O | | 9.3.1.65 | | YES | ignore |
| Activity Notification Level | O | | 9.3.1.67 | | YES | ignore |
| gNB-CU-CP Release Detection Time Stamp | O | — | 9.3.1.XX | — | YES | ignore |

9.3.L.XX. Release Detection Time Stamp

This IE Contains UTC Time Information.

| IE/Group Name | Presence | Range | IE type and reference | Semantics description |
|---|---|---|---|---|
| gNB-CU-CP Release Detection Time Stamp | O | | OCTET STRING (SIZE(4)) | Encoded in the same format as the first four octets of the 64-bit timestamp format as defined in section 6 of IETF RFC 5905 [25]. It indicates the UTC time when the release of the flow/bearer is detected in gNB-CU-CP |

8.3.4.2 Successful Operation

. . .

FIG. 8.3.4.2-1: Bearer Context Release Procedure: Successful Operation.

The gNB-CU-CP initiates the procedure by sending the BEARER CONTEXT RELEASE COMMAND message to the gNB-CU-UP. The gNB-CU-UP replies with the BEARER CONTEXT RELEASE COMPLETE message.

Upon reception of the BEARER CONTEXT RELEASE COMMAND message, the gNB-CU-UP shall release all related signalling and user data transport resources and reply with the BEARER CONTEXT RELEASE COMPLETE message.

The gNB-CU-UP shall, if supported, include the Retainability Measurements Information IE in the BEARER CONTEXT RELEASE COMPLETE message, providing infor-mation on the removed DRB(s) for retainability measurements in the gNB-CU-CP, as described in TS 32.425 [26] and TS 28.552 [22]

If the gNB-CU-CP Release Detection Time Stamp IE is included in BEARER CONTEXT RELEASE COMMAND, the gNB-CU-UP shall, if supported, considers gNB-CU-CP Release Detection Time Stamp for providing the Retainability Measurements Information IE.

8.3.2.2 Successful Operation

If the gNB-CU-CP Release Detection Time Stamp IE is included in BEARER CONTEXT MODIFICATION REQUEST, the gNB-CU-UP shall, if supported, considers gNB-CU-CP Release Detection Time Stamp for providing the Retainability Measurements Information IE.

FIG. 13 is a flowchart illustrating an exemplary process according to an embodiment of the disclosure. As shown, the process involves a UE, an eNB, a gNB-CU-CP and a gNB-CU-UP. In this process, the gNB-CU-UP informs the gNB-CU-CP of the gNB-CU-UP Elapsed Time since last data transferred so that the gNB-CU-CP can consider this time and decide the session status. At step A, the gNB-CU-CP detects the release of bearers. It stores this release detection time. At steps 1-9, some procedures which are the same as the existing solution of FIG. 2 are executed. At step 10, the gNB-CU-UP calculates 'gNB-CU-UP Elapsed Time since last data transferred'. It can be calculated as below.

gNB-CU-UP Elapsed Time since last data transferred=the current time at step 10 the time that the last data was transferred.

At step 11, the gNB-CU-UP includes the gNB-CU-UP Elapsed Time since last data transferred in E1AP BEARER CONTEXT RELEASE COMPLETE message. At step B, the gNB-CU-CP decides the session status considering the received 'gNB-CU-UP Elapsed Time since last data transferred' and the detection time at step A. For example, when the gNB-CU-CP receives E1AP BEARER CONTEXT RELEASE COMPLETE message, it gets the current time. The following result can be obtained:

result='gNB-CU-UP Elapsed Time since last data transferred'–(current time-release detection time stored in step A)

If the result value is not more than 100 msec, the gNB-CU-CP decides that the session status is in-session.

FIG. 14 is a diagram illustrating an example for explaining the process of FIG. 13. At step 1, the data stopped at 30 msec. It is the time that the last data was transferred. At step 2, the gNB-CU-CP detects the release of the bearers at 100 msec. It stores this time. At step 3, after E1AP BEARER CONTEXT RELEASE COMMAND is received, the gNB-CU-UP calculates (B) gNB-CU-UP Elapsed Time since last data transferred. The result is as below.

gNB-CU-UP Elapsed Time since last data transferred=150 msec–the time that the last data transferred (30 msec at step1)=120 msec.

The gNB-CU-UP sends E1AP BEARER CONTEXT RELEASE COMPLETE including gNB-CU-UP Elapsed Time since last data transferred to the gNB-CU-CP. The gNB-CU-CP already knows (A) delay time and also receives gNB-CU-UP Elapsed Time since last data transferred from the gNB-CU-UP. So the gNB-CU-CP decides the session status by the below calculation.

(B) gNB-CU-UP Elapsed Time since last data transferred (120 msec)–(A) delay time (50 msec)=70 msec.

Since 70 msec is not more than 100 msec range, the session status is set to in-session.

To support the process of FIG. 13, the following changes highlighted with underlines are proposed to be made to 3GPP TS 38.463 V16.2.0.

9.3.1.71 Retainability Measurements Information

This IE contains information on removed DRB(s) and QoS Flow(s) which are needed to perform retainability measurements.

| IE/Group Name | Presence | Range | IE type and reference | Semantics description | Criticality | Assigned Criticality |
|---|---|---|---|---|---|---|
| DRB Removed List | | 1 | | | — | |
| >DRB Removed Item | | 1 . . . < maxnoofDRBs> | | | — | |
| >>DRB ID | M | | 9.3.1.16 | | — | |
| >>DRB Released In Session | O | | ENUMERATED (released in session, not released in session, . . .) | Indicates if the DRB was "in session" or not (as defined in TS 32.425 [26] and TS 28.552 [22]) when released | — | |
| >>DRB Accumulated Session Time | O | | OCTET STRING (SIZE(5)) | Accumulated "in session" time for the DRB, as defined in TS 32.425 [26] and TS 28.552 [22], in milliseconds | — | |
| >>gNB-CU-UP Elapsed Time since last data transferred | O | | INTEGER (1 . . . 65535, . . .) | The values are expressed in ms. Indicates the elapsed time until gNB-CU-UP sends the message to gNB-CU-CP since the time that the last data was transferred. | — | |
| >>QoS Flow Removed List | | 0 . . . 1 | | | — | |
| >>>QoS Flow Removed Item | | 1 . . . <maxnoofQoSFlows> | | | — | |
| >>>>QoS Flow Identifier | M | | 9.3.1.24 | | — | |

-continued

| IE/Group Name | Presence | Range | IE type and reference | Semantics description | Criticality | Assigned Criticality |
|---|---|---|---|---|---|---|
| >>>>QoS Flow Released In Session | O | | ENUMERATED (released in session, not released in session, . . .) | Indicates if the QoS Flow was "in session" or not (as defined in TS 28.552 [22]), when released | — | |
| >>>>QoS Flow Accumulated Session Time | O | | OCTET STRING (SIZE(5)) | Accumulated "in session" time for the QoS Flow, as defined in TS 28.552 [22], in milliseconds | | |
| >>>>gNB-CU-UP Elapsed Time since last data transferred | O | | INTEGER (1 . . . 65535, . . .) | The values are expressed in ms. Indicates the elapsed time until gNB-CU-UP sends the message to gNB-CU-CP since the time that the last data was transferred. | | |

8.3.4.2 Successful Operation

. . .

FIG. 8.3.4.2-1: Bearer Context Release Procedure: Successful Operation.

The gNB-CU-CP initiates the procedure by sending the BEARER CONTEXT RELEASE COMMAND message to the gNB-CU-UP. The gNB-CU-UP replies with the BEARER CONTEXT RELEASE COMPLETE message.

Upon reception of the BEARER CONTEXT RELEASE COMMAND message, the gNB-CU-UP shall release all related signalling and user data transport resources and reply with the BEARER CONTEXT RELEASE COMPLETE message.

The gNB-CU-UP shall, if supported, include the Retainability Measurements Information IE in the BEARER CONTEXT RELEASE COMPLETE message, providing information on the removed DRB(s) for retainability measurements in the gNB-CU-CP, as described in TS 32.425 [26] and TS 28.552 [22]

If the gNB-CU-UP Elapsed Time since last data transferred IE is included in the Retainability Measurements Information IE in BEARER CONTEXT RELEASE COMPLETE, the gNB-CU-CP shall, if supported, considers gNB-CU-CP Elapsed Time since last data transferred IE for deciding the session status.

8.3.2.2 Successful Operation

. . .

If the gNB-CU-UP Elapsed Time since last data transferred IE is included in the Retainability Measurements Information IE in BEARER CONTEXT MODIFICATION RESPONSE, the gNB-CU-CP shall, if supported, considers gNB-CU-CP Release Elapsed Time IE for deciding the session status.

FIG. 15 is a flowchart illustrating an exemplary process according to an embodiment of the disclosure. As shown, the process involves a UE, an eNB, a gNB-CU-CP and a gNB-CU-UP. In this process, the gNB-CU-UP informs the gNB-CU-CP of the Last Data Transferred Time Stamp (UTC time) so that the gNB-CU-CP can consider this time and decide the session status. Coordinated universal time (or UTC) is the primary time standard by which the world regulates clocks and time. Last Data Transferred Time Stamp is encoded in the same format as the first four octets of the 64-bit timestamp format as defined in section 6 of IETF RFC 5905. At step A, the gNB-CU-CP detects the release of bearers. It stores this release detection time. At steps 1-9, some procedures which are the same as the existing solution of FIG. 2 are executed. At step 10, the gNB-CU-UP converts the time that the last data was transferred to UTC time format. It sets this UTC time to the Last Data Transferred Time Stamp. At step 11, the gNB-CU-UP includes the 'Last Data Transferred Time Stamp' in E1AP BEARER CONTEXT RELEASE COMPLETE message. At step B, the gNB-CU-CP converts the received 'Last Data Transferred Time Stamp' (UTC) to the time format that is used by the gNB-CU-CP. If the time gap between the converted 'Last Data Transferred Time Stamp' and the detection time stored at step A is not more than 100 msec, the gNB-CU-CP decides that the session status is in-session.

FIG. 16 is a diagram illustrating an example for explaining the process of FIG. 15. At step 1, the data stopped at 30 msec. It is the time that the last data was transferred. At step 2, the gNB-CU-CP detects the release of the bearers at 100 msec. It stores this time. At step 3, the gNB-CU-UP receives E1AP BEARER CONTEXT RELEASE COMMAND. Then the gNB-CU-UP converts the time that the last data was transferred to UTC time format. This converted UTC time is set to Last Data Transferred Time Stamp. The gNB-CU-UP sends the E1AP BEARER CONTEXT RELEASE COMPLETE including Last Data Transferred Time Stamp. At step 4, the gNB-CU-CP already knows (A) Release Detection Time and also receives Last Data Transferred Time Stamp from the gNB-CU-UP. The gNB-CU-CP converts Last Data Transferred Time Stamp (UTC) to the time format used in the gNB-CU-CP. It will be 30 msec indicated at step 1. The gNB-CU-CP decides the session status by the below calculation.

(A) Release Detection Time (100 msec)−30 msec=70 msec.

Since 70 msec is not more than 100 msec range, the session status is set to in-session.

To support the process of FIG. 15, the following changes highlighted with underlines are proposed to be made to 3GPP TS 38.463 V16.2.0.

9.3.1.71 Retainability Measurements Information

This IE contains information on removed DRB(s) and QoS Flow(s) which are needed to perform retainability measurements.

| IE/Group Name | Presence | Range | IE type and reference | Semantics description | Criticality | Assigned Criticality |
|---|---|---|---|---|---|---|
| DRB Removed List | | 1 | | | — | |
| >DRB Removed Item | | 1 . . . <maxnoofDRBs> | | | — | |
| >>DRB ID | M | | 9.3.1.16 | | — | |
| >>DRB Released In Session | O | | ENUMERATED (released in session, not released in session, . . .) | Indicates if the DRB was "in session" or not (as defined in TS 32.425 [26] and TS 28.552 [22]) when released | — | |
| >>DRB Accumulated Session Time | O | | OCTET STRING (SIZE(5)) | Accumulated "in session" time for the DRB, as defined in TS 32.425 [26] and TS 28.552 [22], in milliseconds | — | |
| >>gNB-CU-UP Last Data Transferred Time Stamp | O | | 9.3.1.xx | | | |
| >>QoS Flow Removed List | | 0 . . . 1 | | | — | |
| >>>QoS Flow Removed Item | | 1 . . . <maxnoofQoSFlows> | | | — | |
| >>>>QoS Flow Identifier | M | | 9.3.1.24 | | — | |
| >>>>QoS Flow Released In Session | O | | ENUMERATED (released in session, not released in session, . . .) | Indicates if the QoS Flow was "in session" or not (as defined in TS 28.552 [22]), when released | — | |
| >>>>QoS Flow Accumulated Session Time | O | | OCTET STRING (SIZE(5)) | Accumulated "in session" time for the QoS Flow, as defined in TS 28.552 [22], in milliseconds | — | |
| >>>>gNB-CU-UP Last Data Transferred Time Stamp | O | | 9.3.1.xx | | | |

9.3.1.xx. gNB-CU-UP Last Data Transferred Time Stamp
This IE Contains UTC Time Information.

| IE/Group Name | Presence | Range | IE type and reference | Semantics description |
|---|---|---|---|---|
| gNB-CU-UP Last Data Transferred | O | | OCTET STRING (SIZE(4)) | Encoded in the same format as the first four octets of the 64-bit |

-continued

| IE/Group Name | Presence | Range | IE type and reference | Semantics description |
|---|---|---|---|---|
| Time Stamp | | | | timestamp format as defined in section 6 of IETF RFC 5905 [25]. It indicates the UTC time of the the last data transferred on each bearer/flow |

8.3.4.2 Successful Operation

. . .

FIG. 8.3.4.2-1: Bearer Context Release Procedure: Successful Operation.

The gNB-CU-CP initiates the procedure by sending the BEARER CONTEXT RELEASE COMMAND message to the gNB-CU-UP. The gNB-CU-UP replies with the BEARER CONTEXT RELEASE COMPLETE message.

Upon reception of the BEARER CONTEXT RELEASE COMMAND message, the gNB-CU-UP shall release all related signalling and user data transport resources and reply with the BEARER CONTEXT RELEASE COMPLETE message.

The gNB-CU-UP shall, if supported, include the Retainability Measurements Information IE in the BEARER CONTEXT RELEASE COMPLETE message, providing information on the removed DRB(s) for retainability measurements in the gNB-CU-CP, as described in TS 32.425 [26] and TS 28.552 [22]

If the gNB-CU-UP Last Data Transferred Time Stamp IE is included in the Retainability Measurements Information IE in BEARER CONTEXT RELEASE COMPLETE, the gNB-CU-CP shall, if supported, considers gNB-CU-UP Last Data Transferred Time Stamp IE for deciding the session status.

8.3.2.2 Successful Operation

. . .

If the gNB-CU-UP Last Data Transferred Time Stamp IE is included in the Retainability Measurements Information IE in BEARER CONTEXT RELEASE COMPLETE, the gNB-CU-CP shall, if supported, considers gNB-CU-UP Last Data Transferred Time Stamp IE for deciding the session status.

It should be noted that although the exemplary processes of FIGS. 9, 11, 13 and 15 are about E1AP BEARER CONTEXT RELEASE and E1AP BEARER CONTEXT RELEASE COMPLETE, each of these processes can be also applied to E1AP BEARER CONTEXT MODIFICATION REQUEST and E1AP BEARER CONTEXT MODIFICATION RESPONSE. The E1AP BEARER CONTEXT MODIFICATION REQUEST and E1AP BEARER CONTEXT MODIFICATION RESPONSE are used when a portion of the bearers that are set up is released.

FIG. 17 is a diagram illustrating an example for explaining the processes of FIGS. 9, 11, 13 and 15. When any one of these four processes is applied, the scenario shown in FIG. 17 may occur, where the last data was transferred at 50 msec (A). At step 1, the gNB-CU-CP detects the release of the bearers at 30 msec. If the above four processes are not applied, the session status will be not-in-session by the below calculation.

180 msec (Step 3)−30 msec (A)=150 msec. (more than 100 msec)

But when any one of the above four processes is applied, since the time that the last data was transferred is behind of the release detection time (Step A), it is recommended at that time that the session status is set to in-session. The reason is that the session status will be in-session if the gNB-CU-CP sends the message to the gNB-CU-UP at the right time like the range B in terms of the existing solution.

Note that it is possible for the customer to select different ways for detecting the session status. As an option, the customer may use only the new introduced solution described above with reference to any of FIGS. 9, 11, 13 and 15. As another option, the customer may use both the existing solution and the new introduced solution. For example, if the existing solution decides the session status to in-session, in-session is confirmed without applying the new introduced solution. On the other hand, if the existing solution decides the session status to not-in-session, the new introduced solution can double-check whether it is really not-in-session. If the result evaluated by the new introduced solution is in-session, the final session status will be in-session. Thereby, more options can be provided to the customer regarding the detection method of session status.

FIG. 18 is a block diagram showing an apparatus suitable for use in practicing some embodiments of the disclosure. For example, any one of the UP of the base station and the CP of the base station described above may be implemented through the apparatus 1800. As shown, the apparatus 1800 may include a processor 1810, a memory 1820 that stores a program, and optionally a communication interface 1830 for communicating data with other external devices through wired and/or wireless communication.

The program includes program instructions that, when executed by the processor 1810, enable the apparatus 1800 to operate in accordance with the embodiments of the present disclosure, as discussed above. That is, the embodiments of the present disclosure may be implemented at least in part by computer software executable by the processor 1810, or by hardware, or by a combination of software and hardware.

The memory 1820 may be of any type suitable to the local technical environment and may be implemented using any suitable data storage technology, such as semiconductor based memory devices, flash memories, magnetic memory devices and systems, optical memory devices and systems, fixed memories and removable memories. The processor 1810 may be of any type suitable to the local technical environment, and may include one or more of general purpose computers, special purpose computers, microprocessors, digital signal processors (DSPs) and processors based on multi-core processor architectures, as non-limiting examples.

FIG. 19 is a block diagram showing an apparatus implementing a UP of a base station according to an embodiment of the disclosure. As shown, the apparatus 1900 comprises a reception module 1902, a determination module 1904 and a sending module 1906. The reception module 1902 may be configured to receive, from a CP of the base station, a request for releasing at least one bearer for a terminal device, as described above with respect to block 202. The request comprises time information usable for deriving a first time at which the at least one bearer was detected by the CP of the base station as needing to be released. The determination module 1904 may be configured to determine a session status of the at least one bearer based on the time information, as described above with respect to block 304. The sending module 1906 may be configured to send, to the CP of the base station, a response to the request, as described above with respect to block 306. The response comprises the determined session status of the at least one bearer.

FIG. 20 is a block diagram showing an apparatus implementing a CP of a base station according to an embodiment of the disclosure. As shown, the apparatus 2000 comprises a sending module 2002 and a reception module 2004. The sending module 2002 may be configured to send, to a UP of the base station, a request for releasing at least one bearer for a terminal device, as described above with respect to block 502. The request comprises time information usable for deriving a first time at which the at least one bearer was detected by the CP of the base station as needing to be released. The reception module 2004 may be configured to receive, from the UP of the base station, a response to the request, as described above with respect to block 504. The response comprises a session status of the at least one bearer.

FIG. 21 is a block diagram showing an apparatus implementing a CP of a base station according to an embodiment of the disclosure. As shown, the apparatus 2100 comprises a sending module 2102, a reception module 2104 and a determination module 2106. The sending module 2102 may be configured to send, to a UP of the base station, a request for releasing at least one bearer for a terminal device, as described above with respect to block 602. The reception module 2104 may be configured to receive, from the UP of the base station, a response to the request, as described above with respect to block 604. The response comprises time information usable for deriving a first time at which last data was transferred by the UP of the base station over the at least one bearer. The determination module 2106 may be configured to determine a session status of the at least one bearer based on the time information, as described above with respect to block 606.

Figure 22:
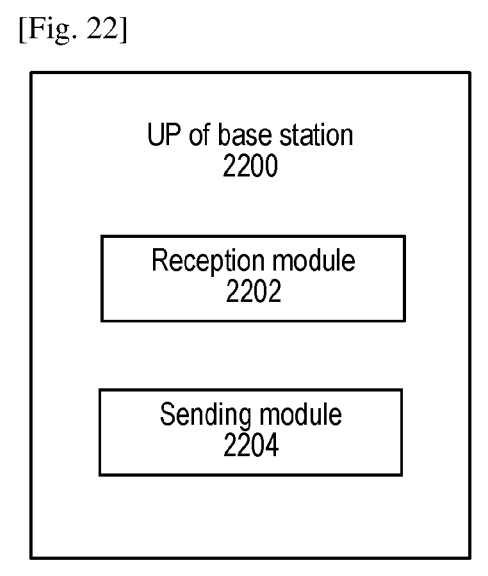

FIG. 22 is a block diagram showing an apparatus implementing a UP of a base station according to an embodiment of the disclosure. As shown, the apparatus 2200 comprises a reception module 2202 and a sending module 2204. The reception module 2202 may be configured to receive, from a CP of the base station, a request for releasing at least one bearer for a terminal device, as described above with respect to block 802. The sending module 2204 may be configured to send, to the CP of the base station, a response to the request, as described above with respect to block 804. The response comprises time information usable for deriving a first time at which last data was transferred by the UP of the base station over the at least one bearer. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements. It should be noted that two blocks shown in succession in the above figures may, in fact, be executed substantially concurrently, or the blocks may sometimes be executed in the reverse order, depending upon the functionality involved.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

The invention claimed is:

1. A method performed by a user plane, UP, of a base station, comprising:

receiving, from a control plane, CP, of the base station, a request for releasing at least one bearer for a terminal device, wherein the request comprises time information usable for deriving a first time at which the at least one bearer was detected by the CP of the base station as needing to be released;

determining a session status of the at least one bearer based on the time information; and sending, to the CP of the base station, a response to the request, wherein the response comprises the determined session status of the at least one bearer.

2. The method according to claim 1, wherein the time information is an elapsed time since the first time until the CP of the base station sends the request to the UP of the base station.

3. The method according to claim 1, wherein the time information is a universal time coordinated, UTC, representation of the first time.

4. The method according to claim 1, wherein determining the session status of the at least one bearer based on the time information comprises:

determining a time interval between the first time derived from the time information and a second time at which last data was transferred by the UP of the base station over the at least one bearer;

comparing the time interval with a predetermined threshold; and determining the session status of the at least one bearer based on a result of the comparison.

5. The method according to claim 4, wherein the time information is an elapsed time since the first time until the CP of the base station sends the request to the UP of the base station; and wherein the time interval is determined as a third time at which the UP of the base station receives the request from the CP of the base station minus a sum of the elapsed time and the second time.

6. The method according to claim 1, wherein the request is a Bearer Context Release Command or a Bearer Context Modification Request; and wherein the response is a Bearer Context Release Complete or a Bearer Context Modification Response.

7. A method performed by a control plane, CP, of a base station, comprising:

sending, to a user plane, UP, of the base station, a request for releasing at least one bearer for a terminal device, wherein the request comprises time information usable for deriving a first time at which the at least one bearer was detected by the CP of the base station as needing to be released; and receiving, from the UP of the base station, a response to the request, wherein the response comprises a session status of the at least one bearer.

8. The method according to claim 7, wherein the time information is an elapsed time since the first time until the CP of the base station sends the request to the UP of the base station.

9. The method according to claim 7, wherein the time information is a universal time coordinated, UTC, representation of the first time.

10. The method according to claim 7, wherein the request is a Bearer Context Release Command or a Bearer Context Modification Request; and wherein the response is a Bearer Context Release Complete or a Bearer Context Modification Response.

11. An apparatus implementing a user plane, UP, of a base station, comprising:

at least one processor; and at least one memory, the at least one memory containing instructions executable by the at least one processor, whereby the apparatus is operative to:

receive, from a control plane, CP, of the base station, a request for releasing at least one bearer for a terminal device, wherein the request comprises time information usable for deriving a first time at which the at least one bearer was detected by the CP of the base station as needing to be released;

determine a session status of the at least one bearer based on the time information; and send, to the CP of the base station, a response to the request, wherein the response comprises the determined session status of the at least one bearer.

12. The apparatus according to claim 11, wherein the time information is an elapsed time since the first time until the CP of the base station sends the request to the UP of the base station.

13. The apparatus according to claim 11, wherein the time information is a universal time coordinated, UTC, representation of the first time.

14. The apparatus according to claim 11, wherein determining the session status of the at least one bearer based on the time information comprises:

determining a time interval between the first time derived from the time information and a second time at which last data was transferred by the UP of the base station over the at least one bearer;

comparing the time interval with a predetermined threshold; and determining the session status of the at least one bearer based on a result of the comparison.

15. The apparatus according to claim 14, wherein the time information is an elapsed time since the first time until the CP of the base station sends the request to the UP of the base station; and wherein the time interval is determined as a third time at which the UP of the base station receives the request from the CP of the base station minus a sum of the elapsed time and the second time.

16. The apparatus according to claim 11, wherein the request is a Bearer Context Release Command or a Bearer Context Modification Request; and wherein the response is a Bearer Context Release Complete or a Bearer Context Modification Response.

* * * * *